US012658116B2

(12) United States Patent
Zhang et al.

(10) Patent No.: US 12,658,116 B2
(45) **Date of Patent: *Jun. 16, 2026**

(54) DISPLAY SUBSTRATE AND DISPLAY APPARATUS

(71) Applicant: BOE TECHNOLOGY GROUP CO., LTD., Beijing (CN)

(72) Inventors: Jian Zhang, Beijing (CN); Zhen Wang, Beijing (CN); Deshuai Wang, Beijing (CN); Han Zhang, Beijing (CN); Wei Yan, Beijing (CN); Jian Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/021,203

(22) Filed: Jan. 15, 2025

(65) Prior Publication Data

US 2025/0157396 A1 May 15, 2025

Related U.S. Application Data

(63) Continuation of application No. 18/519,614, filed on Nov. 27, 2023, now Pat. No. 12,230,196, which is a (Continued)

(30) Foreign Application Priority Data

Sep. 11, 2020 (CN) ......................... 202010953561.9

(51) Int. Cl.
*G09G 3/32* (2016.01)

(52) U.S. Cl.
CPC ....... *G09G 3/32* (2013.01); *G09G 2310/0275* (2013.01); *G09G 2310/0297* (2013.01); *G09G 2310/08* (2013.01)

(58) Field of Classification Search
CPC ......... G09G 2310/0275; G09G 3/2092; G09G 2300/0426; G09G 2310/0297; (Continued)

(56) References Cited

U.S. PATENT DOCUMENTS

2016/0180791 A1* 6/2016 Lee ...................... G09G 3/3614 345/213
2016/0189600 A1* 6/2016 Shin ..................... G09G 3/3688 345/212
2018/0031936 A1* 2/2018 Enami ................. G02F 1/13458

* cited by examiner

*Primary Examiner* — Muhammad N Edun
(74) *Attorney, Agent, or Firm* — HOUTTEMAN LAW LLC

(57) ABSTRACT

A display substrate and a display apparatus are provided. The display substrate includes a base substrate; sub-pixels arranged in an array and on the base substrate; data line groups on the base substrate; each data line group includes data lines, each of which is connected to one column of sub-pixels; data selectors on the base substrate and connected to the data line groups in a one-to-one correspondence; data lines in a same data line group are connected to a same data selector; and data selection signal lines, wherein different data selection signal lines output different data selection signals; and different data lines connected to a same data selector correspond to different data selection signal lines, respectively. The display panel provided may effectively reduce the resistance on the data selection signal lines, thereby reducing the delay of the data selection signals and further improving the charging uniformity of sub-pixels.

19 Claims, 9 Drawing Sheets

Related U.S. Application Data continuation of application No. 17/789,768, filed as application No. PCT/CN2021/113172 on Aug. 18, 2021, now Pat. No. 11,900,862.

(58) Field of Classification Search
CPC ........ G09G 2310/08; G09G 3/32; G09G 3/20; G09G 2370/08; G09F 9/30
See application file for complete search history.

DISPLAY SUBSTRATE AND DISPLAY APPARATUS

This is a continuation application of U.S. patent application Ser. No. 18/519,614, filed on Nov. 27, 2023, which is a continuation application of U.S. patent application Ser. No. 17/789,768, filed on Jun. 28, 2022, a National Phase Application filed under 35 U.S.C. 371 as a national stage of PCT/CN2021/113172 filed on Aug. 18, 2021, the content of each of which is hereby incorporated by reference in its entirety.

TECHNICAL FIELD

The present disclosure relates to the field of display technology, and in particular to a display substrate and a display apparatus.

BACKGROUND

When the number of pixel units of a display panel is great, that is, when a resolution or a size of the display panel is great, data voltage output channels of a source driver cannot be in one-to-one correspondence with sub-pixels in each column of the pixel unit, and at least two columns of the sub-pixels need to be driven by a data voltage output by one data voltage output channel, so that it is necessary to provide a data selector, which inputs the data voltage output by the data voltage output channel to one column of sub-pixels gated by a data selection signal, in response to the data selection signal output by a timing controller. In the related art, the data selection signal is generally introduced to each data selector through one data selection signal line. However, data selection signals are necessarily provided to all the data selectors through one data selection signal line, so that the data selection signal line has a large impedance, resulting in a large delay of the data selection signals.

SUMMARY

The present disclosure is directed to solve at least one of the problems in the prior art, and provides a display substrate, which may effectively reduce a resistance of a data selection signal line, thereby reducing the delay of the data selection signals and improving the charging uniformity of each sub-pixel.

In a first aspect, an embodiment of the present disclosure provides a display substrate, including:

- a base substrate;
- a plurality of sub-pixels arranged in an array and on the base substrate;
- a plurality of data line groups on the base substrate; wherein each data line group includes a plurality of data lines, each of which is connected to one column of sub-pixels;
- a plurality of data selectors on the base substrate and connected to the plurality of data line groups in a one-to-one correspondence; wherein data lines in a same data line group are connected to a same data selector; and
- a plurality of data selection signal lines, wherein different data selection signal lines output different data selection signals; and different data lines connected to a same data selector correspond to different data selection signal lines, respectively.

In some examples, each of the data selection signal lines includes a plurality of signal sub-lines, and signal sub-lines of a same data selection signal line transmit a same data selection signal.

In some examples, each of the plurality of data line groups includes a plurality of data lines, and

- in the plurality of data lines of a same data line group, any two adjacent data lines are spaced from each other by at least one of the plurality of data lines; or
- each of the plurality of data line groups includes adjacent ones of the plurality of data lines.

In some examples, wherein each of the plurality of data line groups includes two adjacent data lines;

- the display substrate includes a first data selection signal line and a second data selection signal line;
- the first data selection signal line includes two first signal sub-lines sequentially corresponding to data lines, which are connected to odd columns of sub-pixels, in the plurality of data line groups connected to the plurality of data selectors; and
- the second data selection signal line includes two second signal sub-lines sequentially corresponding to data lines, which are connected to even columns of sub-pixels, in the plurality of data line groups connected to the plurality of data selectors.

In some examples, each of the plurality of data line groups includes two adjacent data lines;

- the display substrate includes a first data selection signal line and a second data selection signal line;
- the first data selection signal line includes four first signal sub-lines sequentially corresponding to data lines, which are connected to odd columns of sub-pixels, in the plurality of data line groups connected to the plurality of data selectors; and
- the second data selection signal line includes four second signal sub-lines sequentially corresponding to data lines, which are connected to even columns of sub-pixels, in the plurality of data line groups connected to the plurality of data selectors.

In some examples, each of the plurality of data line groups includes one first data line and one second data line; the first data line and the second data line of a same data line group are spaced from each other by one data line of another data line group;

- the display substrate includes a first data selection signal line and a second data selection signal line;
- the first data selection signal line includes four first signal sub-lines, which sequentially correspond to the first data lines in the data line groups connected to the plurality of data selectors; and
- the second data selection signal line includes four second signal sub-lines, which sequentially correspond to the second data lines in the data line groups connected to the plurality of data selectors.

In some examples, a first sub-pixel, a second sub-pixel and a third sub-pixel arranged in sequence along a first direction form one pixel unit; pixel units in a same column are connected to a same data line group; each data line group includes three adjacent data lines connected to one column of first sub-pixels, one column of second sub-pixels and one column of third sub-pixels, respectively;

- the display substrate includes a first data selection signal line, a second data selection signal line and a third data selection signal line;
- the first data selection signal line includes two first signal sub-lines sequentially corresponding to data lines, which are in data line groups connected to the plurality of data selectors and are connected to first sub-pixels;

the second data selection signal line includes two second signal sub-lines sequentially corresponding to data lines, which are in data line groups connected to the plurality of data selectors and are connected to second sub-pixels; and the third data selection signal line includes two third signal sub-lines sequentially corresponding to data lines, which are in data line groups connected to the plurality of data selectors and are connected to third sub-pixels.

In some examples, each of the plurality of data selectors includes a plurality of transistors;

the number of transistors in each of the plurality of data selectors is the same as the number of data lines in each of the plurality of data line groups;

control electrodes of transistors in each of the plurality of data selectors are connected to corresponding data selection signal lines;

first electrodes of transistors are connected to different data lines, and second electrodes of transistors are connected together to receive data voltage.

In some examples, each data selector includes a first transistor and a second transistor;

a first electrode of the first transistor in each data selector is connected to a corresponding data line, and a first electrode of the second transistor in each data selector is connected to a corresponding data line;

the display substrate includes a first data selection signal line and a second data selection signal line, the first data selection signal line is connected to control electrodes of first transistors in the plurality of data selectors;

the second data selection signal line is connected to control electrodes of second transistors in the plurality of data selectors; and the second electrodes of the first transistor and the second transistor in each of the plurality of data selectors are connected together.

In some examples, the display substrate includes first and second sides opposite to each other, third and fourth sides opposite to each other;

the display substrate further includes a timing controller arranged on a side of the plurality of sub-pixels close to the first side; and the plurality of data selectors are between the timing controller and the plurality of sub-pixels.

In some examples, the display substrate further includes a plurality of connectors on the base substrate and between the timing controller and the plurality of data selectors, wherein the plurality of connectors are arranged along an extending direction of the first side, the plurality of connectors are connected to the timing controller;

each data selection signal line includes a plurality of signal sub-lines, each of the plurality of signal sub-lines extends along the extending direction of the first side, and a connector closest to the third side and a connector closest to the fourth side in the plurality of connectors are connected to two ends of each signal sub-line, respectively.

In some examples, the display substrate further includes a plurality of connectors on the base substrate and between the timing controller and the plurality of data selectors, wherein the plurality of connectors are arranged along an extending direction of the first side, the plurality of connectors are connected to the timing controller;

each data selection signal line includes a plurality of signal sub-lines, each of the plurality of signal sub-lines extends along the extending direction of the first side, and each signal sub-line is connected to each connector through pins of each connector close to the third side and the fourth side.

In some examples, each of the plurality of connectors is a chip on flex.

In some examples, the display substrate further includes a source driver which includes a plurality of data voltage output channels, wherein each of the plurality of data selectors is connected to one of the plurality of data voltage output channels.

In a second aspect, an embodiment of the present disclosure provides a display apparatus, which includes the above display substrate.

The present disclosure has the following beneficial effects:

According to the display substrate and the display apparatus provided by the embodiment of the present disclosure, different data selection signal lines correspond to different data lines on a same data selector. That is, different data lines are controlled by different data selection signal lines, respectively, so that the number of the data selection signal lines connected to the data lines is increased, the resistance of the data selection signal lines may be effectively reduced, and therefore, the delay of data selection signals may be reduced, and the charging uniformity of each sub-pixel may be improved.

DETAIL DESCRIPTION OF EMBODIMENTS

Figure 1:
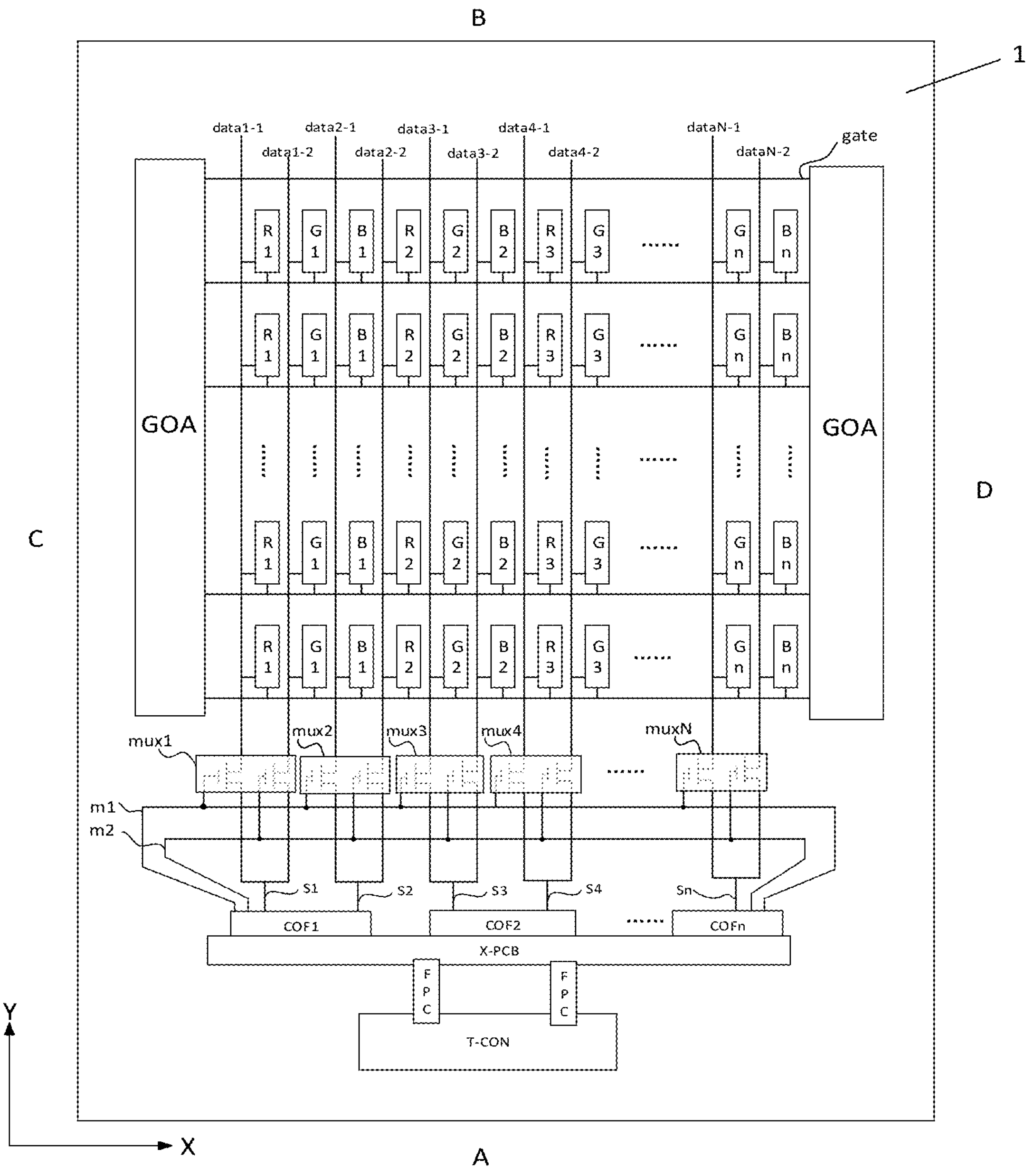
FIG. 1 is a plan diagram of a structure of a display substrate according to an embodiment of the present disclosure.

In order to make objects, technical solutions and advantages of the present disclosure more apparent, the present disclosure will be described in further detail with reference to the accompanying drawings. Apparently, the described embodiments are only part, not all, of embodiments of the present disclosure. All other embodiments, which may be obtained by a person skilled in the art without any creative effort based on the embodiments in the present disclosure, belong to the protection scope of the present disclosure.

Shapes and sizes of components in the drawings are not to scale, but are merely intended to facilitate an understanding of the embodiments of the present disclosure.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

Transistors used in the embodiments of the present disclosure may be thin film transistors or field effect transistors or other devices having the same characteristics. A source electrode and a drain electrode of the transistor may be interchanged under certain conditions, so that the source electrode and the drain electrode are same in context of the connection relationship. In the embodiments of the present disclosure, to distinguish between the source electrode and the drain electrode of the transistor, one of the electrodes is referred to as a first electrode, the other electrode is referred to as a second electrode, and a gate electrode is referred to as a control electrode. Further, transistors may be classified into N-type and P-type transistors according to their characteristics. In the following embodiments, as an example, the transistors are P-type transistors. When a P-type transistor is adopted, the first electrode is the source electrode of the P-type transistor, the second electrode is the drain electrode of the P-type transistor. When a low level signal is input to the gate electrode, the source electrode and the drain electrode are turned on. When an N-type transistor is adopted, the first electrode is the drain electrode of the N-type transistor, and the second electrode is the source electrode of the N-type transistor. When a high level signal is input to the gate electrode, the source electrode and the drain electrode are turned on. It is contemplated that the implementation of the transistors as N-type transistors will be readily apparent to one skilled in the art without creative effort and thus, is within the scope of the embodiments of the present disclosure.

It should be noted that the transistors used in the embodiments of the present disclosure may be thin film transistors or field effect transistors or other switching devices with the same characteristics, and the thin film transistors may include oxide semiconductor thin film transistors, amorphous silicon thin film transistors or poly-silicon thin film transistors, etc. A source electrode and a drain electrode of a transistor may be symmetrical in structure, so that there may be no difference in physical structure of the source electrode and the drain electrode. In the embodiments of the present disclosure, in order to distinguish between transistors, in addition to a gate electrode as a control electrode, one of the electrodes is directly described as a first electrode, and the other electrode is directly described as a second electrode, so that the first electrode and the second electrode of each of all or part of the transistors in the embodiments of the present disclosure may be interchanged as necessary.

It should be noted that each of a first direction and a second direction may be any direction, and the first direction and the second direction intersect with each other. For example, the display substrate includes a first side A and a second side B opposite to each other, and a third side C and a fourth side D opposite to each other, wherein the first side A is connected between the third side C and the fourth side D, the first direction may be an extending direction (e.g., a row direction) of the first side A of the display substrate, and the second direction may be an extending direction (e.g., a column direction) of the third side C of the display substrate. For convenience of description, as an example, the first direction is a row direction (X direction) parallel to a lower side of the display substrate; the second direction is a column direction (Y direction) parallel to a right side of the display substrate; and the first direction and the second direction are perpendicular to each other or approximately perpendicular to each other.

The embodiments of the present disclosure are not limited to the embodiments shown in the drawings, but include modifications of configurations formed based on a manufacturing process. Thus, regions illustrated in the drawings have schematic properties, and shapes of the regions shown in the drawings illustrate specific shapes of regions of elements, but are not intended to be limiting.

As shown in FIG. 1, in the display substrate according to the embodiment of the present disclosure, sub-pixels may be arranged in an array; wherein every three sub-pixels with different colors form one pixel unit. For example, the pixel unit includes a red sub-pixel (R1 to Rn in FIG. 1), a green sub-pixel (G1 to Gn in FIG. 1), and a blue sub-pixel (B1 to Bn in FIG. 1). It should be noted that in the embodiment of the present disclosure, a color of each sub-pixel may be determined according to a color of a light emitting device in the sub-pixel. For example, the light emitted by the light emitting device in the sub-pixel is red light, and at this time, the sub-pixel is called a red sub-pixel. Alternatively, if colors of light emitted by all light emitting devices in the display substrate are the same, for example, the light emitted by each light emitting device is white light, a color of each sub-pixel may be determined according to a color of a color filter in a color filter substrate disposed opposite to the display substrate in the display panel with the display substrate. For example, if a color of a color filter on the color filter substrate corresponding to a certain sub-pixel is red, the sub-pixel is called a red sub-pixel.

As shown in FIG. 1, a specific structure of an exemplary display substrate is given; the display substrate includes a plurality of columns of data lines (such as data1-1 to dataN-2 in FIG. 1) and a plurality of rows of gate lines gate, wherein the plurality of gate lines gate extend along a first direction (such as an X direction in FIG. 1), the plurality of data lines data extend along a second direction (such as a Y direction in FIG. 1), the gate lines gate and the data lines data cross with each other, and sub-pixels are defined at the crossing positions; the sub-pixels in the same column has a same color, every three adjacent sub-pixels along the first direction (the X direction in FIG. 1) form one pixel unit, and the three sub-pixels in each pixel unit are a red sub-pixel (for example, one of R1 to Rn in FIG. 1), a green sub-pixel (for example, one of G1 to Gn in FIG. 1) and a blue sub-pixel (for example, one of B1 to Bn in FIG. 1) respectively; the sub-pixels in the same row are connected to a same gate line gate, the sub-pixels in the same column are connected to a same data line. For example, in FIG. 1, red sub-pixels R1 in the same column are connected to a data line data1-1, green sub-pixels G1 in the same column are connected to a data line data1-2, and blue sub-pixels B1 in the same column are connected to a data line data2-1; at least one of the third side C and the fourth side D of the display substrate may be provided with a Gate Driver on Array (GOA), the plurality of gate lines gate are connected to the GOA, and the GOA transmits scan signals to the plurality of gate lines gate, respectively.

It should be noted that the display substrate provided in the embodiments of the present disclosure may have any shape, for example, a rectangular shape, a circular shape, a hexagonal shape, or the like. For convenience of description, as an example, the display substrate is rectangular. The rectangular display substrate includes the first side A and the second side B which are opposite to each other, and the third side C and the fourth side D which are opposite to each other. The first side A is a lower side, the second side B is an upper side, the third side C is a left side, and the fourth side D is a right side, as an example. The first side A is a side where the plurality of data lines are connected to respective data selectors.

In a first aspect, as shown in FIG. 1, the embodiment of the present disclosure provides a display substrate including a base substrate 1 and a plurality of sub-pixels (R1 to Rn, B1 to Bn, G1 to Gn in FIG. 1), a plurality of groups of data lines (a plurality of data line groups) data1 to dataN, a plurality of data selectors mux1 to muxN, a plurality of data selection signal lines (e.g. m1 and m2 in FIG. 1) disposed on the base substrate 1.

In particular, the plurality of sub-pixels are arranged in an array and disposed on the base substrate 1. The plurality of data line groups are disposed on the base substrate 1; each data line group includes a plurality of data lines; each data line is connected to a column of sub-pixels. The data line groups are connected to the data selectors in a one-to-one correspondence; the plurality of data lines in a same data line group are connected to a same data selector; each data selector is connected to a data voltage output channel; each data selector responds to a data selection signal, which is used for controlling the data selector to gate (select) one data line in the data line group connected to the data selector, and the data selector inputs a data voltage output by the data voltage output channel connected to the data selector into the gated (selected) data line, so that the data lines in one data line group may be driven by one data voltage output channel. Each data selector is also connected to a plurality of data selection signal lines; the number of the data selection signal lines connected to each data selector is the same as the number of the data lines in the data line group; the data selection signal lines are used for transmitting data selection signals; different data selection signal lines transmit different data selection signals; different data lines connected to the same data selector correspond to different data selection signal lines, respectively. That is, if each data line group includes two data lines and the data line groups are connected to the data selectors in a one-to-one correspondence, at least two data selection signal lines are needed, i.e., a first data selection signal line and a second data selection signal line. The first data selection signal line corresponds to one data line in each data line group through the data selector, and the second data selection signal line corresponds to the other data line in each data line group through the data selector; when the first data selection signal line transmits a first data selection signal to each data selector, each data selector transmits the data voltage output by the data voltage output channel to one data line corresponding to the first data selection signal in each data group in response to the first data selection signal; when the second data selection signal line transmits a second data selection signal to each data selector, the data selector transmits the data voltage output from the data voltage output channel to another data line corresponding to the second data selection signal in each data group in response to the second data selection signal. For example, as shown in FIG. 1, as an example, two adjacent data lines are as a data line group, and the red sub-pixel, the green sub-pixel and the blue sub-pixel adjacent to each other in the X direction are as a pixel unit. The first data line group data1 includes two data lines (data1-1 and data1-2), the data line data1-1 is connected to the red sub-pixels R1 of one column of first pixel units, and the data line data1-2 is connected to the green sub-pixels G1 of one column of first pixel units; the second data line group data2 includes two data lines (data2-1 and data2-2), the data line data2-1 is connected to blue sub-pixels B1 of the first pixel units, the data line data2-2 is connected to red sub-pixels R2 of one column of second pixel units, . . . , and the Nth data line group dataN includes two data lines (dataN-1 and dataN-2), the data line dataN-1 is connected to green sub-pixels Gn of one column of Nth pixel units, and the data line dataN-2 is connected to blue sub-pixels Bn of one column of Nth pixel units, where N may be any integer greater than 2 depending on the desired resolution of the display substrate. The plurality of data selectors mux1 to muxN are arranged on the base substrate 1, and are connected to the data line groups data1 to dataN in a one-to-one correspondence. For example, the first data line group data1 is connected to the first data selector mux1; and the data line data1-1 and the data line data1-2 in the first data line group data1 are both connected to the first data selector mux1; the second data line group data2 is connected to the second data selector mux2; the data line data2-1 and data line data2-2 in the second data line group data2 are both connected to the second data selector mux2, the Nth data line group dataN is connected to the Nth data selector muxN, and the data line dataN-1 and dataN-2 in the Nth data line group dataN are both connected to the Nth data selector muxN. The data selectors mux1 to muxN are connected to data voltage output channels S1 to Sn, respectively; the display substrate further includes the first data selection signal line m1 and the second data selection signal line m2; the first data selection signal line m1 transmits the first data selection signal; the first data selection signal line m1 corresponds to data line groups data1 to dataN (one data line in each data line group) connected to the data line selectors mux1 to muxN. For example, the first data selection signal line m1 corresponds to the data line data1-1 in the first data line group data1, and the data line data2-1 in the second data line group data2, . . . , the data line dataN-1 in the Nth data line group dataN; the second data selection signal line m2 transmits the second data selection signal; the second data selection signal line m2 corresponds to data line groups data1 to dataN (the other data line in each data line group) connected to the data line selectors mux1 to muxN. For example, the second data selection signal line m2 corresponds to the data line data1-2 in the first data line group data1, and the data line data2-2 in the second data line group data2, . . . , the data line dataN-2 in the Nth data line group dataN. Based on the above connection relationship, if the first data selection signal line m1 receives the first data selection signal and inputs it to the data line selectors mux1 to muxN, the data line selectors mux1 to muxN input data voltages output from data voltage output channels S1 to Sn to the data line data1-1 in the first data line group data1, the data line data2-1 in the second data line group data2, . . . , and the data line dataN-1 in the Nth data line group dataN; if the second data selection signal line m2 receives the second data selection signal and inputs it to the data line selectors mux1 to muxN, the data line selectors mux 1 to muxN inputs data voltages output from the data voltage output channels S1 to Sn to the data line data1-2 in the first data line group data1, the data line data2-2 in the second data line group data2, . . . , and the data line dataN-2 in the Nth data line group dataN, so that one data voltage output channel (i.e., one data voltage signal) may drive two data lines by means of the first data selection signal line m1 and the second data selection signal line m2, thereby reducing the number of required data voltage output channels. The above term "correspond to" or "corresponding to" means that if a same data selector includes a plurality of transistors, different data lines correspond to source electrodes, drain electrodes or gate electrodes of different transistors. For example, different data lines correspond to drain electrodes of different transistors and different data selection signal lines are connected to gate electrodes of different transistors. In this case, the term "correspond to" or "corresponding to" means that the gate electrode and the drain electrode of a same transistor of a same data selector are connected to one data selection signal line and one data line, respectively.

Figure 2:
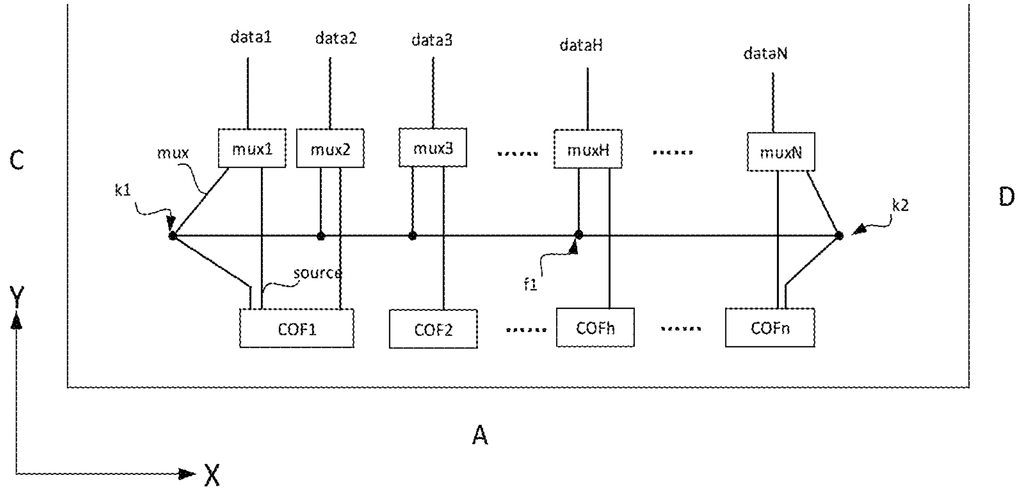
FIG. 2 is a schematic diagram of a distal end and a proximal end of a data selection signal line in a display substrate.
Figure 3:
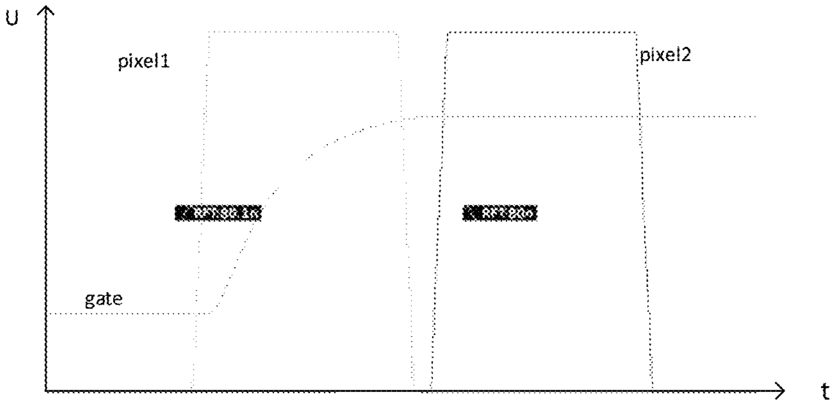
FIG. 3 is a waveform diagram showing a charging of two sub-pixels (pixel1 and pixel2) at a proximal end of a single data selection signal line in an embodiment of the single data selection signal line.
Figure 4:
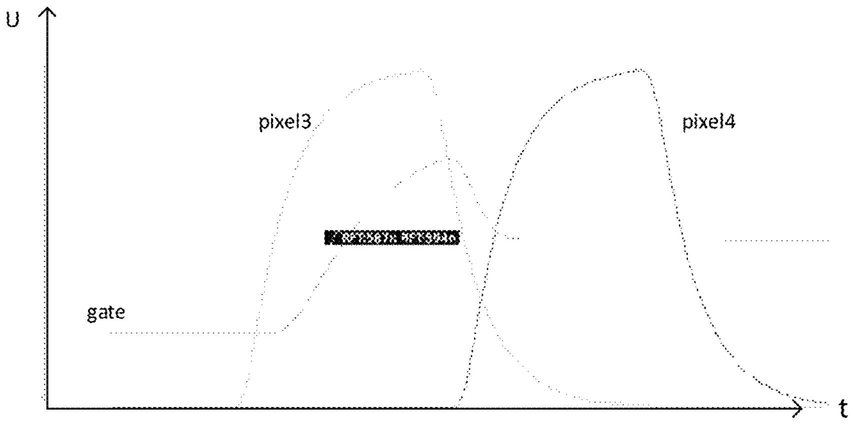
FIG. 4 is a waveform diagram showing a charging of two sub-pixels (pixel3 and pixel4) at a distal end of a single data selection signal line in an embodiment of the single data selection signal line.

As shown in FIG. 2, in the display substrate in the related art, one data selection signal line corresponds to the data lines, and the data line groups are controlled by time-sharing transmission of data selection signals; the data selection signal line mux extends along an extending direction (i.e., the X direction) of the first side A of the display substrate; the data selection signals are input into the data selectors mux1 to muxN from both ends of the data selection signal line mux close to the third side C and the fourth side D of the display substrate; the data selectors mux1 to muxN are connected to the data line groups data1 to dataN; and due to the influence of an impedance of the data selection signal line mux and a parasitic capacitance generated by the data lines controlled by the data selection signal line mux (especially, when the number of the data lines on the display substrate is large, the sum of the parasitic capacitance generated by the data lines is large), the delay effect (RC loading) of the data selection signal input from a proximal end of the data selection signal line mux (i.e., a position (e.g., K1) close to the third side C or a position (e.g., K2) close to the fourth side D), is much less than that of the data selection signal input from a distal end of the data selection signal line mux (i.e., a position (e.g., a middle position f1) away from the third side C and the fourth side D), so that under a same scan signal, a charging time of each column of sub-pixels driven by the data line groups (e.g., data1 and dataN) to which the data selectors (e.g., mux1 and muxN) receiving the data selection signal input from the proximal end of the mux are connected, is longer than that of each column of sub-pixels driven by the data line group (dataH) to which the data selector (e.g., muxH) receiving the data selection signal input from the distal end of the mux is connected, so that a charging rate of each column of sub-pixels driven by the data line group dataH at the distal end is lower than that of each column of sub-pixels driven by the data groups data1 and dataN at the proximal end, and further, charging rates of the sub-pixels at different positions are not uniform, and a luminance of a sub-pixel at the proximal end (i.e., a middle region of the display substrate) is lower than that of a sub-pixel at the distal end (i.e., the left and right sides of the display substrate). Referring to FIGS. 3 and 4, FIG. 3 is a waveform diagram showing a charging of two sub-pixels (pixel1 and pixel2) at the proximal end of the data selection signal line mux. FIG. 4 is a waveform diagram showing a charging of two sub-pixels (pixel3 and pixel4) at the distal end of the data selection signal line mux, wherein a rising edge time Tr and a falling edge time Tf of each of the sub-pixels (e.g., pixel1 and pixel2) corresponding to the proximal end of the mux each is about 80 ns; a charging rate of each of the sub-pixels is 96.2%; and Tr and Tf of each of the sub-pixels (pixel3 and pixel4) corresponding to the distal end of the mux are about 567 ns and 594 ns, respectively; and the charging rate of each of the sub-pixels is less than 50%. In the display substrate provided by the embodiment of the present disclosure, different data selection signal lines (e.g., m1 and m2 in FIG. 1) correspond to different data lines of the same data selector, that is, different data lines are controlled by different data selection signal lines, so that compared with the case where one data selection signal line corresponds to each data line, in the embodiment of the present disclosure, the number of data selection signal lines corresponding to data lines is increased, so that the resistance of the plurality of data selection signal lines may be effectively reduced, the delay of the data selection signals transmitted on the plurality of data selection signal lines may be reduced, a difference between the charging rates of the sub-pixels corresponding to the distal end and the sub-pixels corresponding to the proximal end of each data selection signal line may be reduced, and the charging uniformity of each sub-pixel may be improved. It should be noted that the rising edge time Tr and the falling edge time Tf herein represent a rising time of a waveform from 10% to 90% and a falling time of a waveform from 90% to 10%, respectively. For example, the overall rising time from a low level to a high level is 100%, a time period of the waveform during 10%~90% is the rising edge time Tr; and the overall falling time from a high level to a low level is 100%, a time period of the waveform during 90%~10% is the falling edge time Tf.

Figure 5:
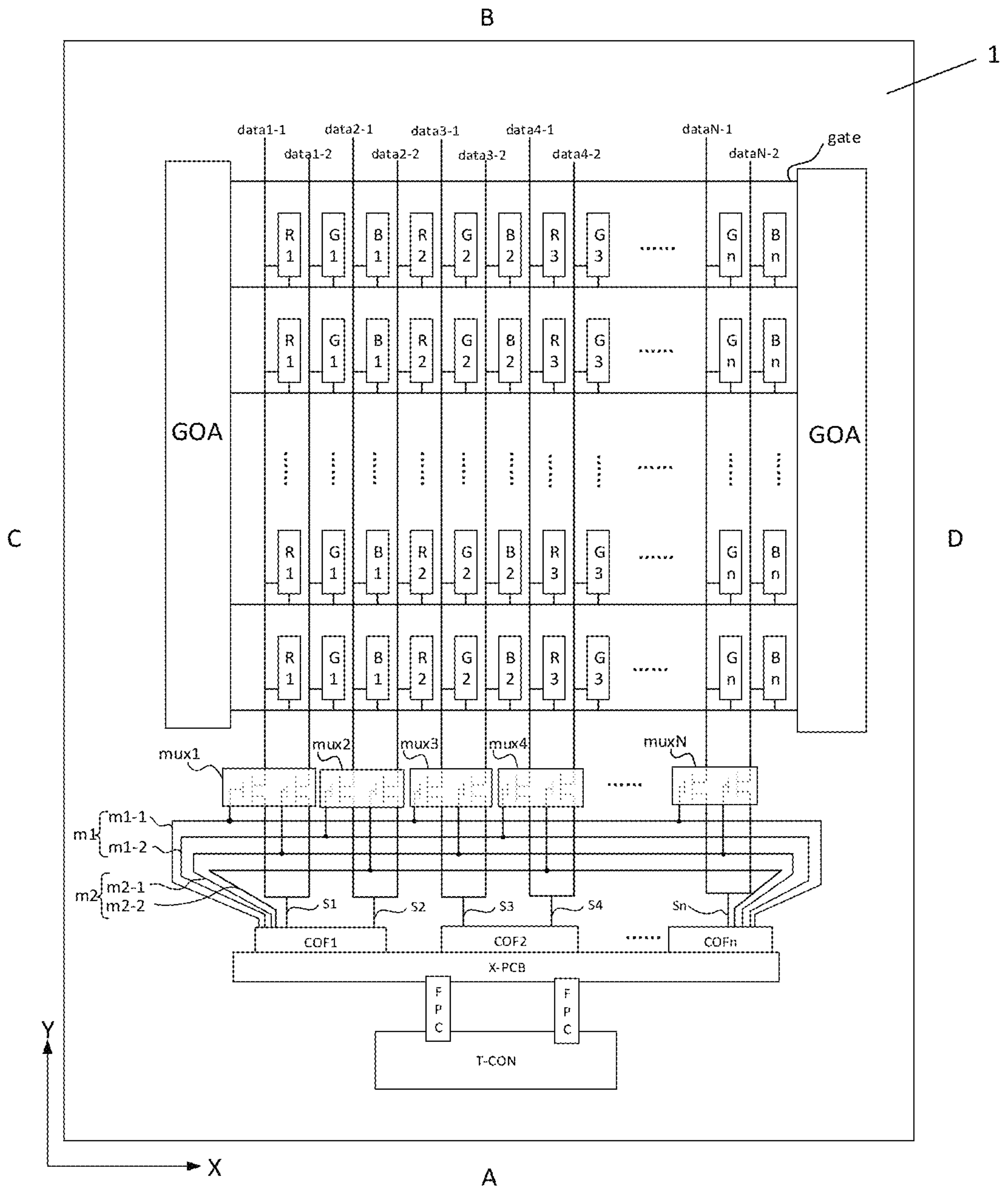
FIG. 5 is a plan diagram of another structure of a display substrate according to an embodiment of the present disclosure (four signal sub-lines).
Figure 6:
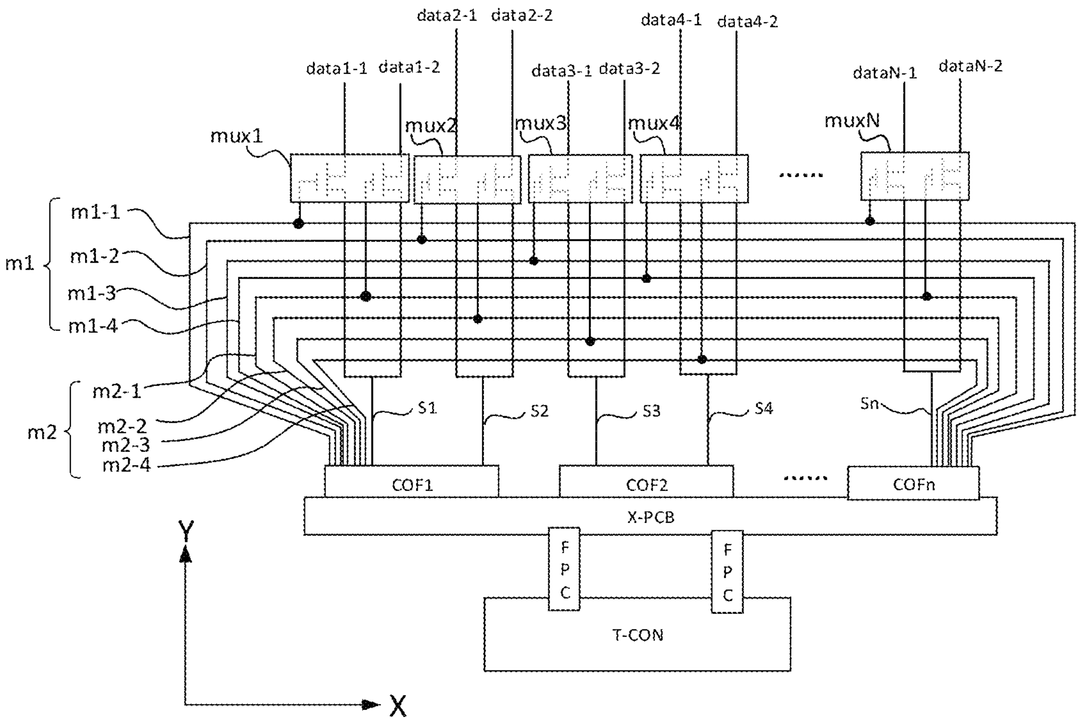
FIG. 6 is a schematic diagram illustrating a connection in a display substrate according to an embodiment of the present disclosure (eight signal sub-lines, two adjacent data lines forming one data line group).
Figure 7:
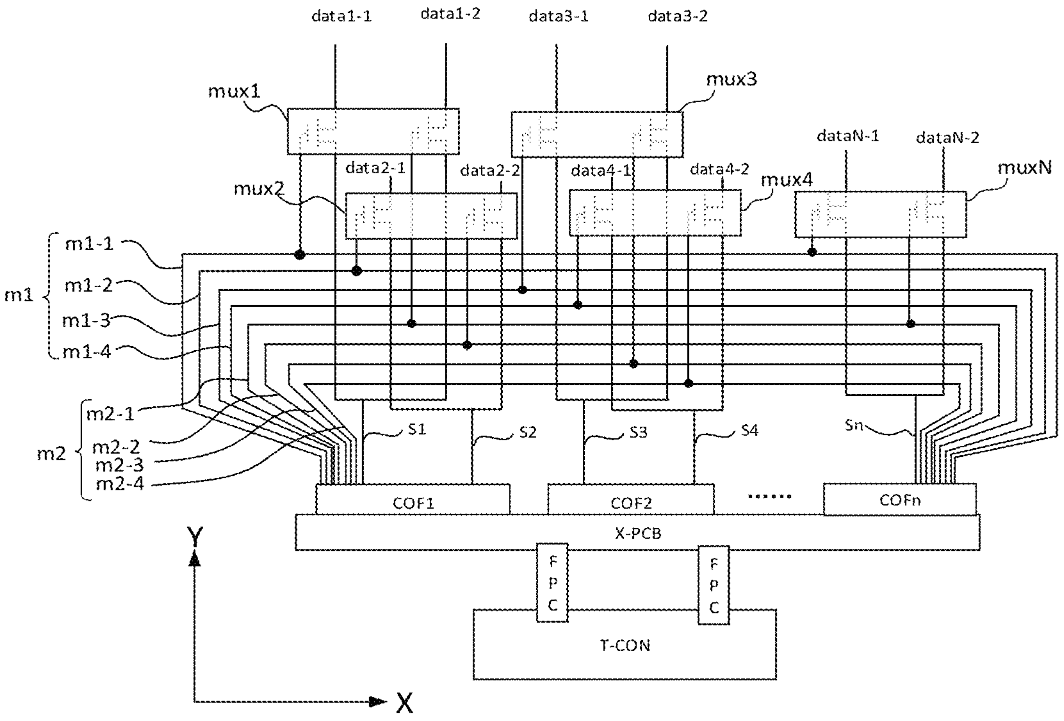
FIG. 7 is a schematic diagram illustrating another connection in a display substrate according to an embodiment of the present disclosure (eight signal sub-lines, two data lines spaced by one column of sub-pixels forming one data line group).
Figure 8:
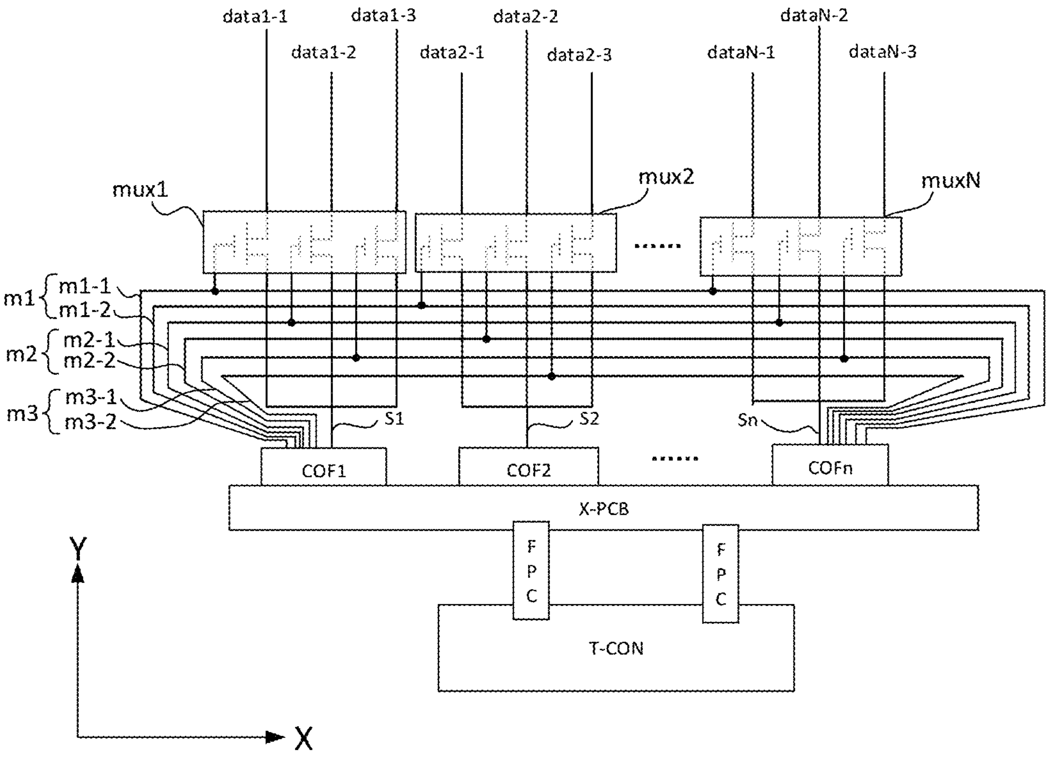
FIG. 8 is a plan diagram of another connection in a display substrate according to an embodiment of the present disclosure (six signal sub-lines).

In the display substrate provided by the embodiment of the present disclosure, as shown in FIGS. 5 to 8, the plurality of data lines may be divided into a plurality of data line groups in any manner. For example, each data line group includes a plurality of data lines, and any two adjacent data lines of the plurality of data lines in the same data line group are spaced from each other by at least one data line. For example, referring to FIG. 7, each data line group includes two data lines spaced from each other by one data line. For another example, each data line group includes a plurality of adjacent data lines (as shown in FIGS. 5 to 6, 8), which is not limited herein, as long as the data selection signal lines corresponding to different data lines in the same data line group are different. It should be noted that any two adjacent data lines of the plurality of data lines in the same data line group are spaced from each other by at least one data line, and the "adjacent data lines" described herein are adjacent data lines in the plurality of data lines already belonging to the same data line group.

In some examples, as shown in FIGS. 5 to 8, each data selection signal line may include a plurality of signal sub-lines; the data selection signals transmitted on the signal sub-lines of the same data selection signal line are the same; and different data lines connected to the same data selector respectively correspond to different data selection signal lines (i.e., the plurality of signal sub-lines of each data selection signal line). The plurality of signal sub-lines sequentially correspond to data lines corresponding to the data selection signal line in each data line group. A plurality of groups of signal sub-lines transmitting the same data selection signal correspond to different data lines in each data line group, so that the number of signal lines (i.e., signal sub-lines of the data selection signal lines) corresponding to the data lines is further increased, so that the data lines are controlled by the plurality of signal sub-lines, which may effectively reduce a resistance of each signal sub-line, and further, reduce the difference in charging rates between the sub-pixel corresponding to the distal end and the sub-pixel corresponding to the proximal end of each signal sub-line, and improve the charging uniformity of each sub-pixel. In addition, in the display substrate provided in the embodiment of the present disclosure, the plurality of data lines may be divided into a plurality of data line groups in various ways, and each data line group may have any number of data lines. For example, two adjacent data lines may form one data line group, and be driven by using one data voltage output channel. Alternatively, three adjacent data lines may form one data line group. For example, a pixel unit includes a red sub-pixel, a blue sub-pixel and a green sub-pixel; three data lines corresponding to the same column of pixel units form one data line group are driven by using one data voltage output channel. Data lines corresponding to sub-pixels having a same color of the plurality of pixel units may form one data line group. For example, four data lines connected to four columns of red sub-pixels in four adjacent columns of pixel units form one data line group; four data lines connected to four columns of blue sub-pixels in four adjacent columns of pixel units form one data line group; four data lines connected to four columns of green sub-pixels in four adjacent columns of pixel units form one data line group; then, four data lines are driven by one data voltage output channel. The number of the signal sub-lines in the data selection signal line is not limited, and the signal sub-lines of the data selection signal line may correspond to the data lines in each data line group corresponding to the data selection signal line in various ways, as long as it is ensured that the signal sub-lines corresponding to data lines in each data line group belong to different data selection signal lines. That is, the data selection signals transmitted on the signal sub-lines connected to data lines in each data line group are different. The following examples are given. In the following example, the plurality of data selectors mux1 to muxN are disposed at a position of the sub-pixel array close to the first side A, and arranged along the first direction (the X direction); signal sub-lines of the plurality of data selection signal lines extend in the first direction (the X direction), and each of the signal sub-lines inputs the data selection signal to the data selectors mux1 to muxN from both ends close to the third side C and the fourth side D of the display substrate.

In some examples, as shown in FIG. 5, each data line group includes two adjacent data lines, i.e., two data lines are driven by one data voltage output channel; each data selection signal line includes two signal sub-lines (four signal sub-lines in total). As an example, a red sub-pixel, a green sub-pixel, and a blue sub-pixel arranged in sequence along the X direction form a pixel unit. For example, the first data line group data1 includes a data line data1-1 and a data line data1-2; the data line data1-1 is connected to a first column of sub-pixels (i.e., red sub-pixels R1 of a column of first pixel units); and the data line data1-2 is connected to a second column of sub-pixels (i.e., green sub-pixels G1 of the column of first pixel units); the second data line group data2 includes a data line data2-1 and a data line data2-2; the data line data2-1 is connected to a third column of sub-pixels (i.e., blue sub-pixels B1 of the column of first pixel units); the data line data2-2 is connected to a fourth column of sub-pixels (i.e., red sub-pixels R2 of a column of second pixel units), . . . , the Nth data line group dataN includes two data lines (dataN-1 and dataN-2); the data line dataN-1 is connected to a (N-1)th column of sub-pixels (i.e., green sub-pixels Gn of a column of the Nth pixel units); and the data line dataN-2 is connected to a (N-2)th column of sub-pixels (i.e., blue sub-pixels Bn of the column of the Nth pixel units), where N may be any integer greater than 2 depending on the desired resolution of the display substrate. The display substrate further includes a plurality of data selector mux1 to muxN, which are connected to the data line groups data1 to dataN in a one-to-one correspondence. For example, the first data line group data1 is connected to the first data selector mux1; and the data line data1-1 and the data line data1-2 in the first data line group data1 are both connected to the first data selector mux1; the second data line group data2 is connected to the second data selector mux2; the data line data2-1 and the data line data2-2 in the second data line group data2 are both connected to the second data selector mux2 the Nth data line group dataN is connected to the Nth data selector muxN; the data line dataN-1 and the data line dataN-2 in the Nth data line group dataN are both connected to the Nth data selector muxN. The data selectors mux1 to muxN are connected to data voltage output channels S1 to Sn, respectively. In this example, the data voltage output by each data voltage output channel drives two data lines in the data group corresponding to the data selector connected to the data voltage output channel. For example, the data voltage output by the first data voltage output channel S1 drives data lines data1-1 and data1-2 in the first data line group data1 connected to the first data selector mux1. The display substrate includes the first data selection signal line m1 and the second data selection signal line m2; the first data selection signal line m1 includes two first signal sub-lines (a first signal sub-line m1-1 and a first signal sub-line m1-2, respectively), which transmit the same first data selection signal. The second data selection signal line m2 includes two second signal sub-lines (a second signal sub-line m2-1 and a second signal sub-line m2-2, respectively), which transmit the same second data selection signal. The different data lines connected to the same data selector correspond to different data selection signal lines, respectively. That is, one of the two data lines in the same data line group corresponds to any one of the two first signal sub-lines m1-1 and m1-2 of the first data selection signal line m1; and the other one of the two data lines in the same data line group corresponds to any one of the two second signal sub-lines m2-1 and m2-2 of the second data selection signal line m2. As shown in FIG. 5, the two adjacent data lines form one data line group, and in view of the above, i.e., the first data selection signal line ml controls the data lines connected to the sub-pixels of odd columns (the 1st, 3rd, 5th, . . . , (2N-1)th column of sub-pixels); and the second data selection signal line m2 controls the data lines connected to the sub-pixels of even columns (the 2nd, 4th, 6th, . . . , 2Nth column of sub-pixels); the two first signal sub-lines m1-1 and m1-2 of the first data selection signal line m1 are connected in sequence to the data lines, which are connected to the sub-pixels in the odd columns, in the data line groups data1 to dataN connected to the data selectors mux 1 to muxN; the two second signal sub-lines m2-1 and m2-2 of the second data selection signal line m2 are connected in sequence to the data lines, which are connected to the sub-pixels in the even columns, in the data line groups data1 to dataN connected to the data selectors mux1 to muxN. For example, referring to FIG. 5, in the data lines connected to the 1st, 3rd, 5th, . . . , (2N-1)th column of sub-pixels in data groups data1 to dataN, the data lines (e.g., data1-1, data3-1 in FIG. 5) connected to the 1st, 5th, 9th, . . . , (2N-3)th column of sub-pixels are connected to the first signal sub-line m1-1 of the first data selection signal line m1; the data lines (e.g., data2-1, data4-1 in FIG. 5) connected to the 3rd, 7th, 11th, . . . , (2N-1)th column of sub-pixels are connected to the first signal sub-line mux1-2 of the first data selection signal line m1; the same first data selection signal is transmitted on the first signal sub-line mux1-1 and the first signal sub-line mux1-2, to control the data selectors mux1 to muxN to input data voltages into data lines connected to the sub-pixels in the odd columns, so as to drive the sub-pixels in the odd columns; in the data lines connected to the 2nd, 4th, 6th, . . . , 2Nth column of sub-pixels in data groups data1 to dataN, the data lines (e.g., data1-2, data3-2 in FIG. 5) connected to the 2nd, 6th, 8th, . . . , (2N-2)th column of sub-pixels are connected to the second signal sub-line m2-1 of the second data selection signal line m2; the data lines (e.g., data2-2, data4-2 in FIG. 5) connected to the 4th, 6th, 10th, . . . , 2Nth column of sub-pixels are connected to the second signal sub-line mux2-2 of the second data selection signal line m2; the same first data selection signal is transmitted on the second signal sub-line mux2-1 and the second signal sub-line mux2-2, to control the data selectors mux1 to muxN to input data voltages into data lines connected to the sub-pixels in the even columns, so as to drive the sub-pixels in the even columns. The first data selection signals are transmitted through the two first signal sub-lines, and the second data selection signals are transmitted through the two second signal sub-lines. In this way, compared with the case where only two data selection signal lines are used for respectively transmitting the first data selection signals and the second data selection signals, the resistance of the plurality of signal lines (the first signal sub-lines and the second signal sub-lines) may be effectively reduced, so that the delay of the data selection signals (the first data selection signals and the second data selection signals) transmitted on the plurality of signal lines may be reduced, and the difference between the charging rates of the sub-pixels corresponding to the distal end and the sub-pixels corresponding to the proximal end of the plurality of signal lines may be reduced, and the charging uniformity of the sub-pixels may be improved.

In some examples, as shown in FIG. 6, the region where sub-pixels are located is omitted, for ease of description. Each data line group includes two adjacent data lines, namely, two data lines are driven by using one data voltage output channel, each data selection signal line includes four signal sub-lines (eight signal sub-lines in total). As an example, a red sub-pixel, a green sub-pixel, and a blue sub-pixel arranged in sequence along the X direction form a pixel unit. For example, the first data line group data1 includes a data line data1-1 and a data line data1-2; the data line data1-1 is connected to a first column of sub-pixels (i.e., red sub-pixels R1 of a column of first pixel units); and the data line data1-2 is connected to a second column of sub-pixels (i.e., green sub-pixels G1 of the column of first pixel units); the second data line group data2 includes a data line data2-1 and a data line data2-2; the data line data2-1 is connected to a third column of sub-pixels (i.e., blue sub-pixels B1 of the column of first pixel units); the data line data2-2 is connected to a fourth column of sub-pixels (i.e., red sub-pixels R2 of a column of second pixel units), . . . , the Nth data line group dataN includes two data lines (dataN-1 and dataN-2); the data line dataN-1 is connected to a (N-1)th column of sub-pixels (i.e., green sub-pixels Gn of a column of the Nth pixel units); and the data line dataN-2 is connected to a (N-2)th column of sub-pixels (i.e., blue sub-pixels Bn of the column of the Nth pixel units), where N may be any integer greater than 2 depending on the desired resolution of the display substrate. The display substrate further includes a plurality of data selector mux1 to muxN, which are connected to the data line groups data1 to dataN in a one-to-one correspondence. For example, the first data line group data1 is connected to the first data selector mux1; and the data line data1-1 and the data line data1-2 in the first data line group data1 are both connected to the first data selector mux1; the second data line group data2 is connected to the second data selector mux 2; the data line data2-1 and the data line data2-2 in the second data line group data2 are both connected to the second data selector mux2 the Nth data line group dataN is connected to the Nth data selector muxN; the data line dataN-1 and the data line dataN-2 in the Nth data line group dataN are both connected to the Nth data selector muxN. The data selectors mux1 to muxN are connected to data voltage output channels S1 to Sn, respectively. In this example, the data voltage output by each data voltage output channel drives two data lines in the data group corresponding to the data selector connected to the data voltage output channel. For example, the data voltage output by the first data voltage output channel S1 drives data lines data1-1 and data1-2 in the first data line group data1 connected to the first data selector mux1. The display substrate includes the first data selection signal line m1 and the second data selection signal line m2; the first data selection signal line m1 includes four first signal sub-lines (first signal sub-lines m1-1, m1-2, m1-3, and m1-4, respectively), which transmit the same first data selection signal. The second data selection signal line m2 includes four second signal sub-lines (second signal sub-lines m2-1, m2-2, m2-3, and m2-4, respectively), which transmit the same second data selection signal. The different data lines connected to the same data selector correspond to different data selection signal lines, respectively. That is, one of the two data lines in the same data line group corresponds to any one of the four first signal sub-lines m1-1, m1-2, m1-3, and m1-4 of the first data selection signal line m1; and the other one of the two data lines in the same data line group corresponds to any one of the four second signal sub-lines m2-1, m2-2, m2-3, and m2-4 of the second data selection signal line m2. As shown in FIG. 6, the two adjacent data lines form one data line group, and in view of the above, i.e., the first data selection signal line m1 controls the data lines connected to the sub-pixels of odd columns (the 1st, 3rd, 5th, . . . , (2N-1)th column of sub-pixels); and the second data selection signal line m2 controls the data lines connected to the sub-pixels of even columns (the 2nd, 4th, 6th, . . . , 2Nth column of sub-pixels); the four first signal sub-lines m1-1, m1-2, m1-3, and m1-4 of the first data selection signal line m1 are connected in sequence to the data lines, which are connected to the sub-pixels in the odd columns, in the data line groups data1 to dataN connected to the data selectors mux1 to muxN; the four second signal sub-lines m2-1, m2-2, m2-3, and m2-4 of the second data selection signal line m2 are connected in sequence to the data lines, which are connected to the sub-pixels in the even columns, in the data line groups data1 to dataN connected to the data selectors mux1 to muxN. For example, referring to FIG. 6, four data line groups data1 to data4 formed by eight data lines corresponding to every 8 columns of the sub-pixels are used as one cycle, the data lines on the display substrate cyclically correspond to signal sub-lines in the data selection signal lines in a manner of the eight data lines as a cycle as described. The data line data1-1 connected to the 1st column of sub-pixels, the data line data2-1 connected to the 3rd column of sub-pixels, the data line data3-1 connected to the 5th column of sub-pixels, the data line data4-1 connected to the 7th column of sub-pixels correspond to the first data selection signal line m1; the 1st first signal sub-line m1-1 of the first data selection signal line m1 corresponds to the data line data1-1 connected to the 1st column of sub-pixels; the 2nd first signal sub-line m1-2 of the first data selection signal line m1 corresponds to the data line data2-1 connected to the 3rd column of sub-pixels; the 3rd first signal sub-line m1-3 of the first data selection signal line m1 corresponds to the data line data3-1 connected to the 5th column of sub-pixels; the 4th first signal sub-line m1-4 of the first data selection signal line m1 corresponds to the data line data4-1 connected to the 7th column of sub-pixels; the data lines connected to the odd columns of sub-pixels are connected in the above manner that the 1st, 3rd, 5th and 7th columns of sub-pixels correspond to the four first signal sub-lines m1-1 to m1-4 of the first data selection signal line m1; the four first signal sub-lines m1-1 to m1-4 transmit the same first data selection signal, to control the data selectors mux1 to muxN to input data voltages into the data lines connected to the odd columns of sub-pixels so as to drive the odd columns of sub-pixels. Correspondingly, the data line data1-2 connected to the 2nd column of sub-pixels, the data line data2-2 connected to the 4th column of sub-pixels, the data line data3-2 connected to the 6th column of sub-pixels, the data line data4-2 connected to the 8th column of sub-pixels correspond to the second data selection signal line m2; the 1st second signal sub-line m2-1 of the second data selection signal line m2 corresponds to the data line data1-2 connected to the 2nd column of sub-pixels; the 2nd second signal sub-line m2-2 of the second data selection signal line m2 corresponds to the data line data2-2 connected to the 4th column of sub-pixels; the 3rd second signal sub-line m2-3 of the second data selection signal line m2 corresponds to the data line data3-2 connected to the 6th column of sub-pixels; the 4th second signal sub-line m2-4 of the second data selection signal line m2 corresponds to the data line data4-2 connected to the 8th column of sub-pixels; the data lines connected to the even columns of sub-pixels are connected in the above manner that the 2nd, 4th, 6th and 8th columns of sub-pixels correspond to the four second signal sub-lines m2-1 to m2-4 of the second data selection signal line m2; the four second signal sub-lines m2-1 to m2-4 transmit the same second data selection signal, to control the data selectors mux1 to muxN to input data voltages into the data lines connected to the even columns of sub-pixels so as to drive the even columns of sub-pixels. The first data selection signals are transmitted through the four first signal sub-lines, and the second data selection signals are transmitted through the four second signal sub-lines. In this way, compared with the case where only two data selection signal lines are used for respectively transmitting the first data selection signals and the second data selection signals, the resistance of the plurality of signal lines (the first signal sub-lines and the second signal sub-lines) may be effectively reduced, so that the delay of the data selection signals (the first data selection signals and the second data selection signals) transmitted on the plurality of signal lines may be reduced, and the difference between the charging rates of the sub-pixels corresponding to the distal end and the sub-pixels corresponding to the proximal end of the plurality of signal lines may be reduced, and the charging uniformity of the sub-pixels may be improved.

In some examples, as shown in FIG. 7, the region where sub-pixels are located is omitted, for ease of description. Each data line group includes two data lines, one data line and a data line spaced from the one data line by a column of the sub-pixels form one data line group. That is, in the embodiment, two data lines in the same data line group are separated by one data line; the first data selection signal line includes four first signal sub-lines sequentially corresponding to one data line in each data line group connected to data selectors; the second data selection signal line includes four second signal sub-lines sequentially corresponding to the other data line of each data line group connected to the data selectors. One data voltage output channel drives two data lines in one data line group; the display substrate includes the first data selection signal line and the second data selection signal line; each data selection signal line includes four signal sub-lines (eight signal sub-lines in total). As an example, a red sub-pixel, a green sub-pixel, and a blue sub-pixel arranged in sequence along the X direction form a pixel unit. For example, the first data line group data1 includes a data line data1-1 and a data line data1-2; the data line data1-1 is connected to a first column of sub-pixels (i.e., red sub-pixels R1 of a column of first pixel units); and the data line data1-2 is connected to a third column of sub-pixels (i.e., blue sub-pixels B1 of the column of first pixel units); the second data line group data2 includes a data line data2-1 and a data line data2-2; the data line data2-1 is connected to a second column of sub-pixels (i.e., green sub-pixels G1 of the column of first pixel units); the data line data2-2 is connected to a fourth column of sub-pixels (i.e., red sub-pixels R2 of a column of second pixel units), . . . , the Nth data line group dataN includes two data lines (dataN-1 and dataN-2); the data line dataN-1 is connected to a (N-2)th column of sub-pixels (i.e., red sub-pixels Rn of a column of the Nth pixel units); and the data line dataN-2 is connected to a Nth column of sub-pixels (i.e., blue sub-pixels Bn of the column of the Nth pixel units), where N may be any integer greater than 2 depending on the desired resolution of the display substrate. The display substrate further includes a plurality of data selector mux1 to muxN, which are connected to the data line groups data1 to dataN in a one-to-one correspondence. For example, the first data line group data1 is connected to the first data selector mux1; and the data line data1-1 and the data line data1-2 in the first data line group data1 are both connected to the first data selector mux1; the second data line group data2 is connected to the second data selector mux2; the data line data2-1 and the data line data2-2 in the second data line group data2 are both connected to the second data selector mux2 . . . , the Nth data line group dataN is connected to the Nth data selector muxN; the data line dataN-1 and the data line dataN-2 in the Nth data line group dataN are both connected to the Nth data selector muxN. The data selectors mux1 to muxN are connected to data voltage output channels S1 to Sn, respectively. In this example, the data voltage output by each data voltage output channel drives two data lines in the data group corresponding to the data selector connected to the data voltage output channel. For example, the data voltage output by the first data voltage output channel S1 drives data lines data1-1 and data1-2 in the first data line group data1 connected to the first data selector mux1. The display substrate includes the first data selection signal line m1 and the second data selection signal line m2; the first data selection signal line m1 includes four first signal sub-lines (first signal sub-lines m1-1, m1-2, m1-3, and m1-4, respectively), which transmit the same first data selection signal. The second data selection signal line m2 includes four second signal sub-lines (second signal sub-lines m2-1, m2-2, m2-3, and m2-4, respectively), which transmit the same second data selection signal. The different data lines connected to the same data selector correspond to different data selection signal lines, respectively. That is, one of the two data lines in the same data line group corresponds to any one of the four first signal sub-lines m1-1, m1-2, m1-3, and m1-4 of the first data selection signal line m1; and the other one of the two data lines in the same data line group corresponds to any one of the four second signal sub-lines m2-1, m2-2, m2-3, and m2-4 of the second data selection signal line m2. As shown in FIG. 7, one data line and a data line corresponding to a column of the sub-pixels spaced from the data line form one data line group, and four data line groups data1 to data4 formed by eight data lines corresponding to every 8 columns of the sub-pixels are used as one cycle, the data lines on the display substrate cyclically correspond to signal sub-lines in the data selection signal lines in a manner of the eight data lines as a cycle as described. The data line data1-1 connected to the 1st column of sub-pixels, the data line data2-1 connected to the 2nd column of sub-pixels, the data line data3-1 connected to the 5th column of sub-pixels, the data line data4-1 connected to the 6th column of sub-pixels correspond to the first data selection signal line m1; the 1st first signal sub-line m1-1 of the first data selection signal line m1 corresponds to the data line data1-1 connected to the 1st column of sub-pixels; the 2nd first signal sub-line m1-2 of the first data selection signal line m1 corresponds to the data line data2-1 connected to the 2nd column of sub-pixels; the 3rd first signal sub-line m1-3 of the first data selection signal line m1 corresponds to the data line data3-1 connected to the 5th column of sub-pixels; the 4th first signal sub-line m1-4 of the first data selection signal line m1 corresponds to the data line data4-1 connected to the 6th column of sub-pixels. Correspondingly, the data line data1-2 connected to the 2nd column of sub-pixels, the data line data2-2 connected to the 3rd column of sub-pixels, the data line data3-2 connected to the 7th column of sub-pixels, the data line data4-2 connected to the 8th column of sub-pixels correspond to the second data selection signal line m2; the 1st second signal sub-line m2-1 of the second data selection signal line m2 corresponds to the data line data1-2 connected to the 3rd column of sub-pixels; the 2nd second signal sub-line m2-2 of the second data selection signal line m2 corresponds to the data line data2-2 connected to the 4th column of sub-pixels; the 3rd second signal sub-line m2-3 of the second data selection signal line m2 corresponds to the data line data3-2 connected to the 7th column of sub-pixels; the 4th second signal sub-line m2-4 of the second data selection signal line m2 corresponds to the data line data4-2 connected to the 8th column of sub-pixels. The data lines are connected in the above manner that data lines corresponding to the 1st to 8th columns of sub-pixels correspond to the four first signal sub-lines m1-1 to m1-4 of the first data selection signal line m1 and the four second signal sub-lines m2-1 to m2-4 of the second data selection signal line m2. The four first signal sub-lines m1-1 to m1-4 transmit the same first data selection signal, to control the data selectors mux1 to muxN to input data voltages into the data lines corresponding to the four first signal sub-lines m1-1 to m1-4. The four second signal sub-lines m2-1 to m2-4 transmit the same second data selection signal, to control the data selectors mux1 to muxN to input data voltages into the data lines corresponding to the four second signal sub-lines m2-1 to m2-4. The first data selection signals are transmitted through the four first signal sub-lines, and the second data selection signals are transmitted through the four second signal sub-lines. In this way, compared with the case where only two data selection signal lines are used for respectively transmitting the first data selection signals and the second data selection signals, the resistance of the plurality of signal lines (the first signal sub-lines and the second signal sub-lines) may be effectively reduced, so that the delay of the data selection signals (the first data selection signals and the second data selection signals) transmitted on the plurality of signal lines may be reduced, and the difference between the charging rates of the sub-pixels corresponding to the distal end and the sub-pixels corresponding to the proximal end of the plurality of signal lines may be reduced, and the charging uniformity of the sub-pixels may be improved.

In some examples, as shown in FIG. 8, the region where sub-pixels are located is omitted, for ease of description. A first sub-pixel, a second sub-pixel, and a third sub-pixel arranged in sequence along the first direction (the X direction) form a pixel unit. As an example, the first sub-pixel is a red sub-pixel, the second sub-pixel is a green sub-pixel, and the third sub-pixel is a blue sub-pixel. Pixel units in the same column are connected to the same data line group; each data line group includes three adjacent data lines connected to the red sub-pixels, the blue sub-pixels and the green sub-pixels of one column of pixel units, respectively, that is, one data voltage output channel drives the three data lines corresponding to one column of pixel units; three data selection signal lines are required to correspond to the three data lines corresponding to the sub-pixels of three colors in each data group; each data selection signal line includes two signal sub-lines (six signal sub-lines in total). For example, the first data line group data1 includes data lines data1-1, data1-2 and data1-3; the data line group data1 is correspondingly connected to one column of first pixel units; the data line data1-1 is connected to red sub-pixels R1 of one column of the first pixel units; the data line data1-2 is connected to green sub-pixels G1 of the column of the first pixel units; the data line data1-3 is connected to blue sub-pixels B1 of the column of first pixel units; the second data line group data2 includes data lines data2-1, data2-2 and data2-3; the data line group data2 is correspondingly connected to one column of second pixel units; the data line data2-1 is connected to red sub-pixels R2 of one column of the second pixel units; the data line data2-2 is connected to green sub-pixels G2 of the column of the second pixel units; the data line data2-3 is connected to blue sub-pixels B2 of the column of second pixel units; the Nth data line group dataN includes data lines dataN-1, dataN-2 and dataN-3; the data line dataN-1 is connected to red sub-pixels Rn of one column of the Nth pixel units; the data line dataN-2 is connected to green sub-pixels Gn of the column of the Nth pixel units; the data line dataN-3 is connected to blue sub-pixels Bn of the column of Nth pixel units. N may be any integer greater than 2 depending on the desired resolution of the display substrate. The display substrate further includes a plurality of data selector mux1 to muxN, which are connected to the data line groups data1 to dataN in a one-to-one correspondence. For example, the first data line group data1 is connected to the first data selector mux1; and the data lines data1-1, data1-2 and data1-3 in the first data line group data1 are both connected to the first data selector mux1; the second data line group data2 is connected to the second data selector mux2; the data lines data2-1, data2-2 and data2-3 in the second data line group data2 are both connected to the second data selector mux2 the Nth data line group dataN is connected to the Nth data selector muxN; the data lines dataN-1, dataN-2 and dataN-3 in the Nth data line group dataN are both connected to the Nth data selector muxN. The data selectors mux1 to muxN are connected to data voltage output channels S1 to Sn, respectively. In this example, the data voltage output by each data voltage output channel drives three data lines in the data group corresponding to the data selector connected to the data voltage output channel. For example, the data voltage output by the first data voltage output channel S1 drives data lines data1-1, data1-2 and data1-3 in the first data line group data1 connected to the first data selector mux1. The display substrate includes the first data selection signal line m1, the second data selection signal line m2 and a third data selection line m3; the first data selection signal line m1 is configured to control data lines connected to red sub-pixels in the plurality of data groups; the second data selection signal line m2 is configured to control data lines connected to green sub-pixels in the plurality of data groups; and the third data selection signal line m3 is configured to control data lines connected to blue sub-pixels in the plurality of data groups. The first data selection signal line m1 includes two first signal sub-lines (a first signal sub-line m1-1 and a first signal sub-line m1-2, respectively), which transmit the same first data selection signal. The second data selection signal line m2 includes two second signal sub-lines (a second signal sub-line m2-1 and a second signal sub-line m2-2, respectively), which transmit the same second data selection signal. The third data selection signal line m3 includes two third signal sub-lines (a third signal sub-line m3-1 and a third signal sub-line m3-2, respectively), which transmit the same third data selection signal. The three data lines connected to the same data selector correspond to different data selection signal lines, respectively, that is, a first data line of the three data lines in the same data line group corresponds to any one of the two first signal sub-lines m1-1 and m1-2 of the first data selection signal line m1; a second data line of the same data line group corresponds to any one of the two second signal sub-lines m2-1 and m2-2 of the second data selection signal line m2; and a third data line of the same data line group is connected to any one of the two third signal sub-lines m3-1 and m3-2 of the third data selection signal line m3. As shown in FIG. 6, three adjacent data lines (three data lines corresponding to three sub-pixels of a column of pixel units) form one data line group, and in view of the above, the two first signal sub-lines m1-1 and m1-2 of the first data selection signal line m1 sequentially correspond to the data lines connected to one column of red sub-pixels in the data groups; the two second signal sub-lines m2-1 and m2-2 of the second data selection signal line m2 sequentially correspond to the data lines connected to one column of green sub-pixels in the data groups; the two third signal sub-lines m3-1 and m3-2 of the third data selection signal line m3 sequentially correspond to the data lines connected to one column of blue sub-pixels in the data groups. For example, referring to FIG. 6, by taking two data line groups data1 and data2 consisting of six data lines corresponding to two adjacent columns of pixel units as one cycle, the first column of pixel units corresponds to the first data line group data1; the second column of pixel units corresponds to the data line group data2; and the data lines on the display substrate cyclically correspond to signal sub-lines in the data selection signal lines in a manner of the six data lines as a cycle as described. The data line data1-1 connected to the red sub-pixels R1 of the first column of pixel units corresponds to the first signal sub-line m1-1 of the first data selection signal line m1; the data line data2-1 of the red sub-pixels R2 of the second column of pixel units corresponds to the first signal sub-line m1-2 of the first data selection signal line m1; the data lines connected to the red sub-pixels in the plurality of pixel units sequentially correspond to the two first signal sub-lines m1-1 and m1-2 of the first data selection signal line m1 in the above manner; the two first signal sub-lines m1-1 and m1-2 transmit the same first data selection signal, to control the data selectors mux1 to muxN to input data voltages into the data lines connected to the red sub-pixels in pixel units so as to drive each column of red sub-pixels. Correspondingly, the data line data1-2 connected to the green sub-pixels G1 of the first column of pixel units corresponds to the second signal sub-line m2-1 of the second data selection signal line m2; the data line data2-2 of the green sub-pixels G2 of the second column of pixel units corresponds to the second signal sub-line m2-2 of the second data selection signal line m2; the data lines connected to the green sub-pixels in the plurality of pixel units sequentially correspond to the two second signal sub-lines m2-1 and m2-2 of the second data selection signal line m2 in the above manner; the two second signal sub-lines m2-1 and m2-2 transmit the same second data selection signal, to control the data selectors mux1 to muxN to input data voltages into the data lines connected to the green sub-pixels in pixel units so as to drive each column of green sub-pixels. The data line data1-3 connected to the blue sub-pixels B1 of the first column of pixel units corresponds to the third signal sub-line m3-1 of the third data selection signal line m3; the data line data2-3 of the blue sub-pixels B2 of the second column of pixel units corresponds to the third signal sub-line m3-2 of the third data selection signal line m3; the data lines connected to the blue sub-pixels in the plurality of pixel units sequentially correspond to the two third signal sub-lines m3-1 and m3-2 of the third data selection signal line m3 in the above manner; the two third signal sub-lines m3-1 and m3-2 transmit the same third data selection signal, to control the data selectors mux1 to muxN to input data voltages into the data lines connected to the blue sub-pixels in pixel units so as to drive each column of blue sub-pixels. The first data selection signals are transmitted through the two first signal sub-lines, the second data selection signals are transmitted through the two second signal sub-lines, and the third data selection signals are transmitted through the two third signal sub-lines. In this way, compared with the case where only three data selection signal lines are used for respectively transmitting the first data selection signals, the second data selection signals and the third data selection signals, the resistance of the plurality of signal lines (the first signal sub-lines, the second signal sub-lines and the third signal sub-lines) may be effectively reduced, so that the delay of the data selection signals (the first data selection signals, the second data selection signals and the third data selection signals) transmitted on the plurality of signal lines may be reduced, and the difference between the charging rates of the sub-pixels corresponding to the distal end and the sub-pixels corresponding to the proximal end of the plurality of signal lines may be reduced, and the charging uniformity of the sub-pixels may be improved.

In summary, in the display substrate provided in the embodiment of the present disclosure, the data lines may be grouped in various ways (see FIGS. 5, 7, and 8); different data lines in each data line group may correspond to different data selection signal lines; each data selection signal line may include the plurality of signal sub-lines; and the number of signal sub-lines included in each data selection signal line may be various (see FIGS. 5, 6, and 8). The above is merely an illustrative example, does not include all embodiments, and does not limit the embodiments of the present disclosure. One data selection signal is transmitted through a plurality of signal sub-lines. In this way, compared with the case where one data selection signal line corresponds to all data lines, the plurality of signal sub-lines correspond to the respective data lines, so that the number of the data lines loaded by each signal sub-line may be greatly reduced, and therefore the impedance of the signal sub-lines and the total capacitance value of parasitic capacitance generated by the respective data lines of each signal sub-line may be effectively reduced, the delay effect of the data selection signals transmitted on the signal sub-lines may be reduced, and the charging difference of sub-pixels at positions is further reduced.

It should be noted that the above signal sub-lines sequentially correspond to the data lines. Specifically, in a plurality of data lines corresponding to the same data selection signal line, the plurality of signal sub-lines belonging to the data selection signal line cyclically corresponding to the plurality of data lines in the order of arrangement of the data lines (for example, the data lines are arranged from the third side C to the fourth side D). For example, in the embodiment shown in FIG. 7, two first signal sub-lines m1-1 and m1-2 of the first data selection signal line m1 sequentially correspond to the data line groups data1 to dataN connected to the data selectors mux1 to muxN; in the plurality of data lines connected to the odd columns of the sub-pixels of the plurality of columns of sub-pixels arranged sequentially from the third side C to the fourth side D of the display substrate (the plurality of data lines are considered to be arranged sequentially from the third side C to the fourth side D), the first signal sub-line m1-1 corresponds to a first data line; the first signal sub-line m1-2 corresponds to a second data line; the first signal sub-line m1-1 corresponds to a third data line; the first signal sub-line m1-2 corresponds to a fourth data line; . . . , the first signal sub-line m1-1 and the first signal sub-line m1-2 sequentially and cyclically correspond to all data lines connected to the odd columns of sub-pixels.

Figure 9:
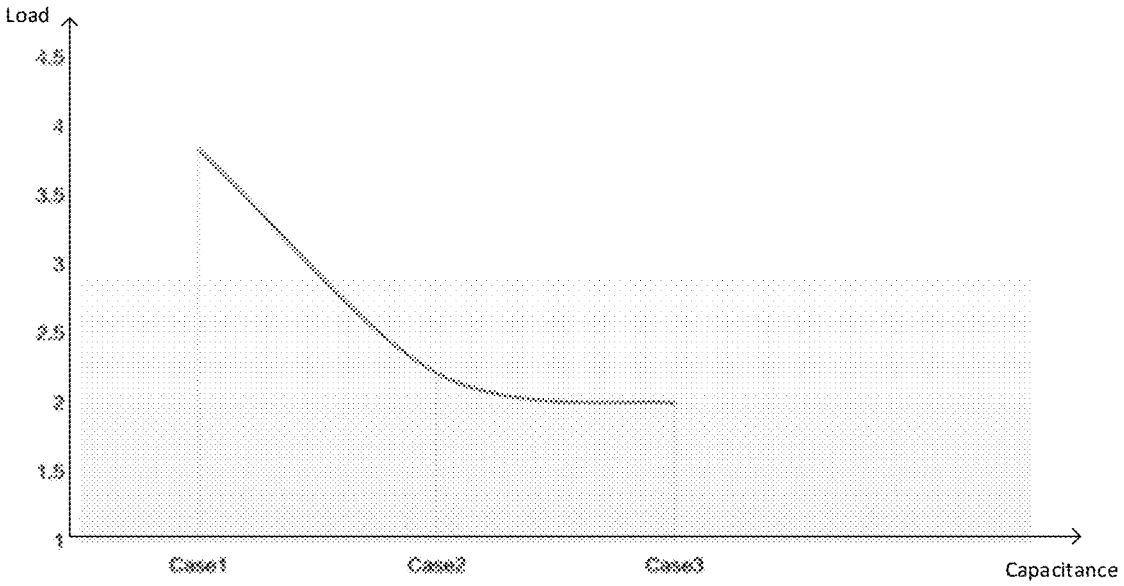
FIG. 9 is a waveform diagram of a load on a data selection signal line of a display substrate according to the embodiments of the present disclosure.

Referring to FIGS. 7 and 9, by taking the embodiment shown in FIG. 7 as an example, each data line group includes two data lines; one data line and a data line spaced from the one data line by a column of the sub-pixels form one data line group; one data voltage output channel drives the two data lines in one data line group; the display substrate includes two data selection signal lines. FIG. 9 is a waveform diagram of a load on a data selection signal line, and case1 corresponds to an embodiment where the display substrate includes only two individual data selection signal lines; case2 corresponds to an embodiment where the display substrate includes two data selection signal lines, each of which includes two signal sub-lines, that is, four signal sub-lines in total are used for transmitting data selection signals; case3 corresponds to an embodiment where the display substrate includes two data selection signal lines, each of which includes four signal sub-lines, that is, eight signal sub-lines in total are used for transmitting data selection signals. It could be seen that the plurality of signal sub-lines are used for transmitting data selection signals, that is, the individual data selection signal line are replaced by the plurality of signal sub-lines which correspond to the data lines in the data line groups corresponding to the data selection signal line, so that the load on each signal sub-line may be effectively reduced.

Figure 10:
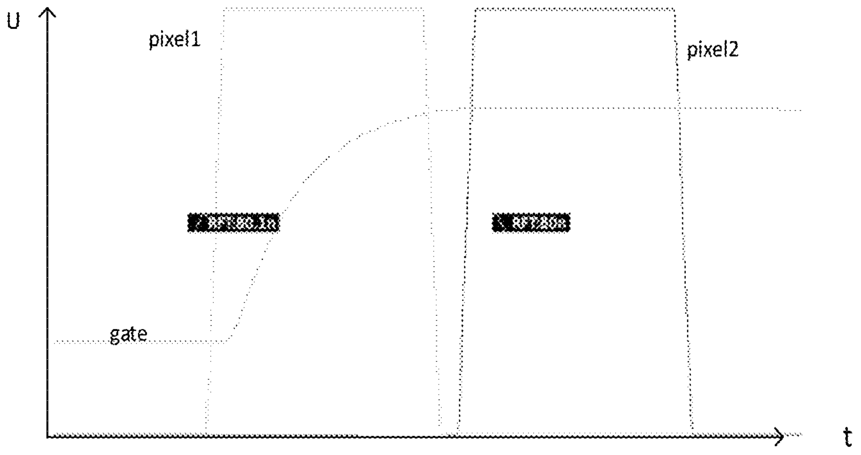
FIG. 10 is a waveform diagram showing a charging of two sub-pixels (pixel1 and pixel2) at a proximal end of the data selection signal line in the embodiment shown in FIG. 7.
Figure 11:
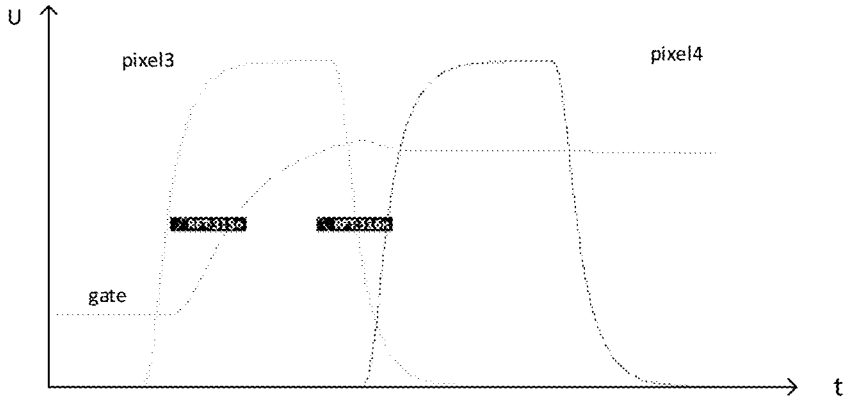
FIG. 11 is a waveform diagram showing a charging of two sub-pixels (pixel3 and pixel4) at a distal end of the data selection signal line in the embodiment shown in FIG. 7.

Referring to FIGS. 7, 10 and 11, a simulation is performed by taking an example in which a line width of a signal sub-line of each data selection signal line is 100 μm, the pixels of the display substrate include 7680 columns×4320 rows, and include 23040 columns of sub-pixels based on the embodiment shown in FIG. 7, so as to obtain the waveform diagrams of a charging of the sub-pixels in FIGS. 10 and 11. At this time, the display substrate includes eight signal sub-lines in total, each of which loads (is connected to) 2880 data lines. FIG. 10 is a waveform diagram showing a charging of two sub-pixels (pixel1 and pixel2) at a proximal end of each data selection signal line (first and second signal sub-lines). FIG. 11 is a waveform diagram showing a charging of two sub-pixels (pixel3 and pixel4) at a distal end of the data selection signal line (first and second signal sub-lines). Tr and Tf of sub-pixels (e.g., pixel1 and pixel2) corresponding to the proximal end of the data selection signal line each are about in a range of 50 nm to 120 nm, for example 80 ns; the charging rate of the sub-pixels is 96.2%; and Tr and Tf of sub-pixels (pixel3 and pixel4) corresponding to the distal end of the data selection signal line are about 567 nm and 594 ns, respectively; the charging rate of the sub-pixels reaches 87.9%. Compared with the embodiment of FIG. 4 using a single data selection signal line for transmission, the charging rate of sub-pixels at the distal end is substantially increased, and the difference between the charging rate of sub-pixels at the distal end and the charging rate of sub-pixels at the proximal end is decreased, thereby increasing the charging uniformity of pixels. The proximal and distal ends are proximal ends k1, k2 and a distal end f1 in FIG. 2.

Figure 12:
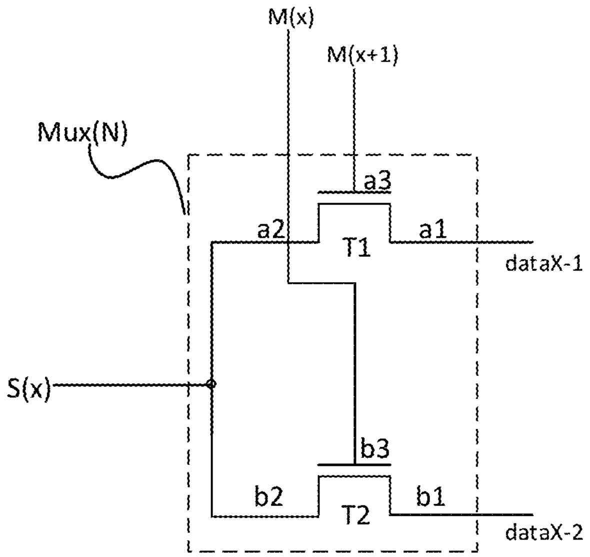
FIG. 12 is a schematic diagram of a structure (including two transistors) of a data selector in a display substrate according to an embodiment of the present disclosure.
Figure 13:
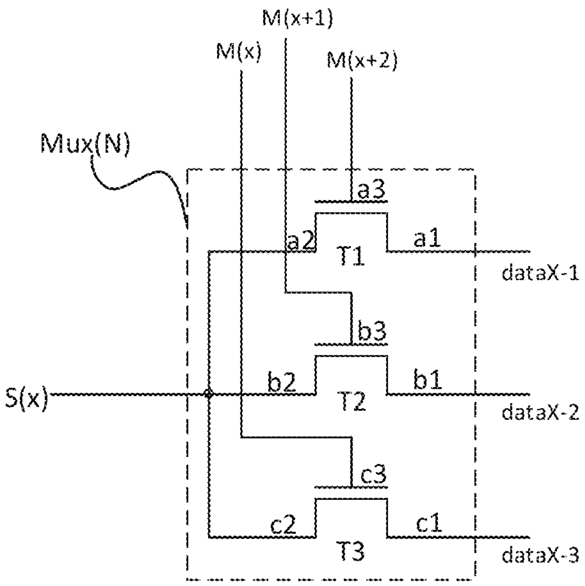
FIG. 13 is a schematic diagram of another structure (including three transistors) of a data selector in a display substrate according to an embodiment of the present disclosure.

In some examples, referring to FIGS. 12 and 13, the display substrate includes a plurality of data selectors, each of the data selectors may include a plurality of transistors, and the number of the transistors in each of the data selectors is the same as the number of the data lines in each of the data line groups, so that the transistors are connected to the data lines in a one-to-one correspondence. A control electrode of each transistor in each data selector is connected to the corresponding data selection signal line; different transistors in the same data selector are connected to different data selection signal lines to receive different data selection signals; first electrodes of transistors are connected to different data lines; and second electrodes of transistors are connected to each other to form an input port through which the data voltage is received.

In some examples, referring to FIG. 12, if one data line group dataX includes two data lines dataX-1 and dataX-2, i.e. two data lines are driven by data voltages output from one data voltage output channel S(x) (such as the embodiments shown in FIGS. 1, 5 to 7), by taking one data selector Mux(N) in data selectors as an example, the other data selectors have a same connection manner as the data line selector Mux(N); the data selector Mux(N) includes a first transistor T1 and a second transistor T2; the data selector Mux(N) is electrically connected to the data line group dataX; the two data lines dataX-1 and dataX-2 in the data line group dataX are respectively connected to the first transistor T1 and the second transistor T2. Specifically, a first electrode a1 of the first transistor T1 is connected to the data line dataX-1 corresponding to the first transistor T1; a first electrode b1 of the second transistor T2 is connected to the data line dataX-2 corresponding to the second transistor T2. The display substrate includes a first data selection signal line M(x) and a second data selection signal line M(x+1), which transmit different data selection signals; the first data selection signal line M(x) is connected to a control electrode a3 of the first transistor T1 in the data line selector Mux(N), and the second data selection signal line M(x+1) is connected to a control electrode b3 of the second transistor T2 in the data line selector Mux(N). The second electrode a2 of the first transistor T1 of the data selector Mux(N) is connected to the second electrode b2 of the second transistor T2, which in turn is connected to the data voltage output channel S(x) to receive the data voltage, so that if the first data selection signal line M(x) transmits the first data selection signal to the control electrode a3 of the first transistor T1, the first transistor T1 is turned on, and the data voltage from the data voltage output channel S(x) is transmitted to the data line dataX-1 connected to the first electrode al of the first transistor T1 through the second electrode a2 of the first transistor T1; accordingly, if the second data selection signal line M(x+1) transmits the second data selection signal to the control electrode b3 of the second transistor T2, the second transistor T2 is turned on, and the data voltage from the data voltage output path S(x) is transmitted to the data line dataX-2 connected to the first electrode b1 of the second transistor T2 through the second electrode b2 of the second transistor T2, so that the data line dataX-1 of the data line group dataX connected to the data selector Mux(N) may be gated by the first data selection signal, and the data line dataX-2 of the data line group dataX connected to the data selector Mux(N) may be gated by the second data selection signal, thereby enabling one data voltage to drive two data lines.

As shown in FIG. 12, similarly, in some examples, the data selector may further include more transistors, and the number of transistors in the data selector is set according to the number of data lines (i.e., the number of data lines in the data line group) required for be driven by one data voltage output channel. If one data line group dataX includes three data lines dataX-1, dataX-2, dataX-3, i.e. three data lines are driven by data voltages output from one data voltage output channel S(x) (such as the embodiment shown in FIG. 8), by taking one data selector Mux(N) of data selectors as an example, the other data selectors have a same connection manner as the data line selector Mux(N); the data selector Mux(N) includes a first transistor T1, a second transistor T2 and a third transistor T3; the data selector Mux(N) is electrically connected to the data line group dataX; the three data lines dataX-1, dataX-2 and dataX-3 of the data line group dataX are respectively connected to the first transistor T1, the second transistor T2 and the third transistor T3. Specifically, a first electrode al of the first transistor T1 is connected to the data line dataX-1 corresponding to the first transistor T1, a first electrode b1 of the second transistor T2 is connected to the data line dataX-2 corresponding to the second transistor T2, and a first electrode c1 of the third transistor T3 is connected to the data line dataX-3 corresponding to the third transistor T3. The display substrate includes a first data selection signal line M(x), a second data selection signal line M(x+1), and a third data selection signal line M(x+2), which transmit different data selection signals. The first data selection signal line M(x) is connected to a control electrode a3 of the first transistor T1 in the data line selector Mux(N), the second data selection signal line M(x+1) is connected to a control electrode b3 of the second transistor T2 in the data line selector Mux(N), and the third data selection signal line M(x+2) is connected to a control electrode c3 of the third transistor T3 in the data line selector Mux(N). The second electrode a2 of the first transistor T1, the second electrode b2 of the second transistor T2 and the second electrode c2 of the third transistor T3 of the data selector Mux(N) are connected together, which in turn is connected to the data voltage output channel S(x) to receive the data voltage, so that if the first data selection signal line M(x) transmits the first data selection signal to the control electrode a3 of the first transistor T1, the first transistor T1 is turned on, and the data voltage of the data voltage output channel S(x) is transmitted to the data line dataX-1 connected to the first electrode a1 of the first transistor T1 through the second electrode a2 of the first transistor T1; accordingly, if the second data selection signal line M(x+1) transmits the second data selection signal to the control electrode b3 of the second transistor T2, the second transistor T2 is turned on, and the data voltage of the data voltage output channel S(x) is transmitted to the data line dataX-2 connected to the first electrode b1 of the second transistor T2 through the second electrode b2 of the second transistor T2; the third data selection signal line M(x+2) transmits a third data selection signal to the control electrode c3 of the third transistor T3, the third transistor T3 is turned on and the data voltage of the data voltage output channel S(x) is transmitted to the data line dataX-3 connected to the first electrode c1 of the third transistor T3 through the second electrode c2 of the third transistor T3, so that the data line dataX-1 of the data line group dataX connected to the data selector Mux(N) may be gated by the first data selection signal, the data line dataX-2 of the data line group dataX connected to the data selector Mux(N) may be gated by the second data selection signal, the data line dataX-3 of the data line group dataX connected to the data selector Mux(N) may be gated by the third data selection signal, thereby enabling one data voltage to drive three data lines.

It should be noted that the above example is only an example of the structure of the data selector in the embodiment of the present disclosure, and the data selector may further include more transistors, which is not limited herein.

In some examples, as shown in FIGS. 5 to 8, as an example, the display substrate is rectangular, and includes the first side A and the second side B opposite to each other, and the third side C and the fourth side D opposite to each other. The display substrate further includes a timing controller (T-CON) disposed at a side of the plurality of sub-pixels adjacent to the first side, and the plurality of data selectors mux1 to muxN are disposed between the T-CON and the plurality of sub-pixels. The T-CON is connected to the GOA and provides a scan signal to the GOA, and is further connected to the plurality of data selection signal lines, and provides data selection signals to the data selection signal lines to drive the data selectors to turn on the gated (selected) data lines.

Figure 14:
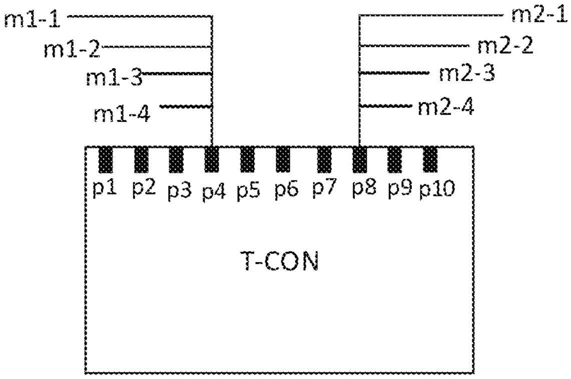
FIG. 14 is a schematic diagram illustrating a connection relationship between a timing controller and signal sub-lines in a display substrate according to an embodiment of the present disclosure.
Figure 15:
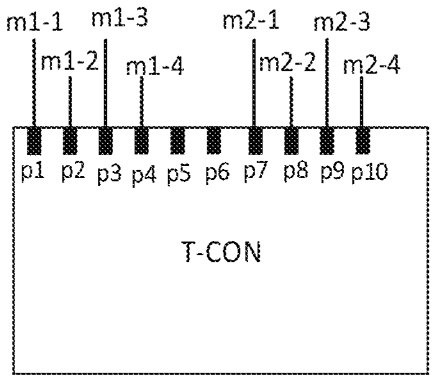
FIG. 15 is a schematic diagram illustrating another connection relationship between a timing controller and signal sub-lines in a display substrate according to an embodiment of the present disclosure.

In some examples, as shown in FIG. 14 and FIG. 15, the T-CON has a plurality of pins (e.g., P1 to P10); the plurality of data selection signal lines are connected to some pins of the T-CON; different data selection signal lines are connected to different pins; and different pins output different data selection signals. If each data selection signal line includes the plurality of signal sub-lines, and the plurality of signal sub-lines of the same data selection signal line transmit the same data signal, the plurality of signal sub-lines of the same data selection signal line may all be connected to one pin of the T-CON, or different signal sub-lines may be connected to different pins of the T-CON, respectively; and the pins connected to the signal sub-lines of the same data selection signal line output the same data selection signal. For example, as shown in FIG. 14, four first signal sub-lines m1-1 to m1-4 of the first data selection signal line m1 are connected to a fourth pin P4 of the T-CON to receive the first data selection signal output from the fourth pin P4, and four second signal sub-lines m2-1 to m2-4 of the second data selection signal line m2 are connected to an eighth pin P8 of the T-CON to receive the second data selection signal output from the eighth pin P8. For example, as shown in FIG. 15, four first signal sub-lines m1-1 to m1-4 of the first data selection signal line m1 are connected to four pins P1 to P4 of the T-CON, respectively; the first pin P1 to the fourth pin P4 all output the same first data selection signal; four second signal sub-lines m2-1 to m2-4 of the second data selection signal line m2 are connected to four pins P7 to P10 of the T-CON, respectively; and the seventh pin P7 to the tenth pin P10 all output the same second data selection signal.

In some examples, as shown in FIGS. 5 to 8, the display substrate further includes a plurality of connectors (e.g., COF1 to COFn), a source driver (not shown), a row direction printed circuit board (X-PCB), a plurality of flexible printed circuits (FPCs), and the like. The connectors are disposed on the base substrate 1 and between the T-CON and the data selectors mux1 to muxN; the connectors are arranged along an extending direction (i.e. the X direction/first direction) of the first side A of the display substrate; and the connectors are configured to connect the T-CON and the data voltage output channels of the source driver, which in turn are connected to the data selectors, so as to transmit the data voltages and the data selection signals to the data selectors. Each connector has a plurality of pins; some of the pins of the plurality of connectors are connected to a row direction printed circuit board (X-PCB), the X-PCB is connected to the pins of the T-CON through the plurality of flexible printed circuits (FPCs); the T-CON transmits the data selection signal to the X-PCB through the FPCs; the X-PCB transmits the data selection signal to corresponding connectors, and the connectors transmits the data selection signal to data selection signal lines connected to the connectors. The source driver includes a plurality of data voltage output channels, which are connected to pins on the connectors; each data selector is connected to the pin of the corresponding data voltage output channel on the corresponding connector. That is, each data selector is connected to one data voltage output channel (for example, one of S1 to Sn). Each connector may be provided with only one pin which is connected to one data voltage output channel of the source driver, i.e., one connector corresponds to one data selector. Each connector may also be provided with a plurality of pins connected to different data voltage output channels of the source driver, respectively, i.e., the plurality of data selectors corresponding to the plurality of data voltage output channels are connected to different pins of one connector to receive voltages output by different data voltage output channels.

It should be noted that the source driver may be externally connected to the connectors. For example, the source driver may be disposed on a circuit board of the T-CON and electrically connected to the connectors through leads. The source driver may also be divided into a plurality of blocks, which are disposed on different connectors, respectively, and are directly connected to pins on the connectors for integral packaging, which is not limited.

In some examples, the connector may be any type. For example, the connector may have a chip on flex (COF) packaging structure; the connector may alternatively have a tape automated bonding (TAB) packaging structure or a chip on glass (COG) packaging structure, or the like, which is not limited. As an example, the connector has the COF packaging structure in the following.

The connector includes a plurality of pins, wherein the pins of at least some of the plurality of connectors COF1 to COFn, which are located close to the third side C (left side) and the fourth side D (right side) of the display substrate, are connected to the pins on the T-CON for outputting the data selection signal. That is, the pins of these connectors close to the left side and the right side of the display substrate may be used for outputting the data selection signal. The connector is provided with at least one pin disposed in the middle region and connected to the data voltage output channel of the source driver, for outputting the data voltage. The data selection signal lines may be connected to at least some of the connectors COF1 to COFn in various ways to receive the data selection signals transmitted by the connectors. It will be illustrated below by giving examples.

In some examples, as shown in FIGS. 1, 5 to 8, each of the plurality of data selection signal lines may be connected to two connectors located at the outermost side to receive different data selection signals. Specifically, the plurality of data selectors mux1 to muxN are disposed at a position of the sub-pixel array close to the first side A, and are arranged along the first direction (the X direction); the plurality of connectors COF1 to COFn are arranged along the first direction (the X direction), and are disposed at positions of the plurality of data selectors mux1 to muxN close to the first side A; the plurality of connectors COF1 to COFn are connected to the plurality of data selectors mux1 to muxN, and transmit data voltage signals to the data selectors mux1 to muxN (for example, different data voltages are output by the plurality of data voltage output channels S1 to Sn); the display substrate includes the plurality of data selection signal lines (e.g., m1 and m2 in FIG. 5), each of which includes the plurality of signal sub-lines (e.g., m1-1 to m2-2 in FIG. 5) extending in the first direction (the X direction); and each signal sub-line has both ends close to the third side C and the fourth side D to which a connector COF1 closest to the third side C and a connector COFn closest to the fourth side D of the plurality of connectors COF1 to COFn are connected, respectively. That is, data selection signals are input to the plurality of data selectors mux1 to xN from positions of the signal sub-lines (e.g., m1-1 to m2-2 in FIG. 5) close to the third side C and the fourth side D of the display substrate.

Figure 16:
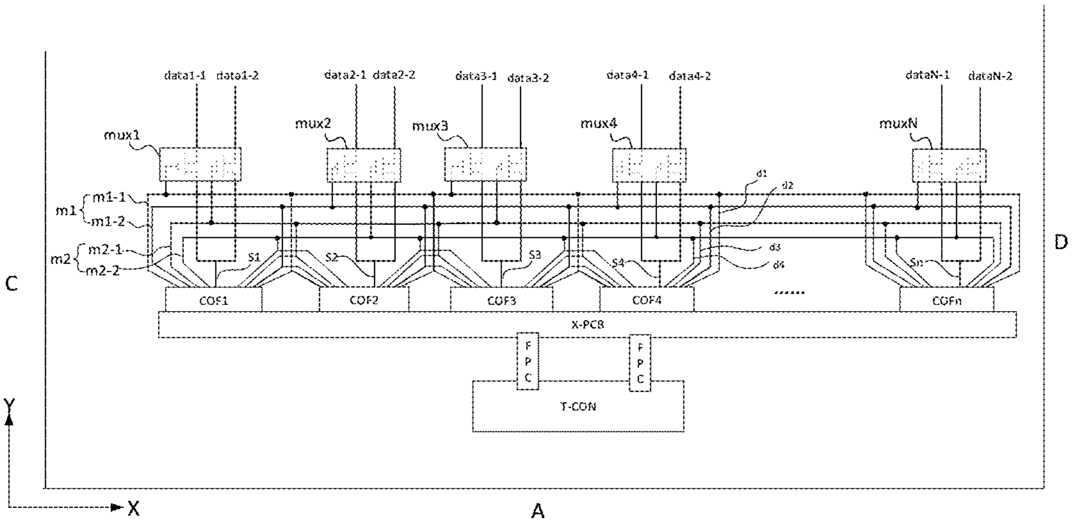
FIG. 16 is a schematic diagram illustrating another connection in a display substrate according to an embodiment of the present disclosure (a plurality of connectors outputting data selection signals).

In some examples, as shown in FIG. 16, each of the plurality of data selection signal lines may be connected to each connector to receive different data selection signals. Specifically, the plurality of data selectors mux1 to muxN are disposed at a position of the sub-pixel array close to the first side A, and are arranged along the first direction (the X direction); the plurality of connectors COF1 to COFn are arranged along the first direction (the X direction), and are disposed at positions of the plurality of data selectors mux1 to muxN close to the first side A; the plurality of connectors COF1 to COFn are connected to the plurality of data selectors mux1 to muxN, and transmit data voltage signals to the data selectors mux1 to muxN (for example, different data voltages are output by the plurality of data voltage output channels S1 to Sn); the display substrate includes the plurality of data selection signal lines, each of which includes the plurality of signal sub-lines. As an example, in FIG. 16, the display substrate includes the first data selection signal line m1 and the second data selection signal line m2; the first data selection signal line m1 includes two first signal sub-lines m1-1 and m1-2, each of which transmits the first data selection signal; the second data selection signal line m2 includes two second signal sub-lines m2-1 and m2-2, each of which transmits the second data selection signal; and the plurality of signal sub-lines (the first signal sub-lines m1-1, m1-2 and the second signal sub-lines m2-1, m2-2) extend in the first direction (the X direction). Each of the plurality of connectors COF1 to COFn included in the display substrate is provided with a plurality of pins (hereinafter, referred to as "functional pins") for outputting data selection signals at positions close to the third side C and the fourth side D; and each signal sub-line is connected to a corresponding connector through the functional pin of the corresponding connector close to the third side C and the fourth side D. Specifically, referring to FIG. 16, hereinafter, a lead connected between the first signal sub-line 1-1 and any one of the connectors is referred to as a first lead d1; a lead connected between the first signal sub-line 1-2 and any one of the connectors is referred to as a second lead d2; a lead connected between the second signal sub-line 2-1 and any one of the connectors is referred to as a third lead d3; and a lead connected between the second signal sub-line 2-2 and any one of the connectors is referred to as a fourth lead d4. The first lead d1 is led out from pins at two sides of the first connector COF1 and is connected to the first signal sub-line m1-1, so that the first data selection signal is input into the first signal sub-line m1-1 from two sides of the first connector COF1 through the first lead d1. The first lead d1 is led out from pins at two sides of the second connector COF2 and is connected to the first signal sub-line m1-1, so that the first data selection signal is input into the first signal sub-line m1-1 from two sides of the second connector COF2 through the first lead d1. The first lead dl is led out from pins at two sides of the nth connector COFn and is connected to the first signal sub-line m1-1, so that the first data selection signal is input into the first signal sub-line m1-1 from two sides of the nth connector COFn through the first lead d1. In this way, the first signal sub-line m1-1 is connected to each of the connectors COF1 to COFn through leads led out from pins at two sides of each connector (pins outputting the first data selection signal), and receives the first data selection signal through the connectors COF1 to COFn. Accordingly, the second lead d2 is led out from pins at two sides of the first connector COF1 and is connected to the first signal sub-line m1-2, so that the first data selection signal is input into the first signal sub-line m1-2 from two sides of the first connector COF1 through the second lead d2. The second lead d2 is led out from pins at two sides of the second connector COF2 and is connected to the first signal sub-line m1-2, so that the first data selection signal is input into the first signal sub-line m1-2 from two sides of the second connector COF2 through the second lead d2 The second lead d2 is led out from pins at two sides of the nth connector COFn and is connected to the first signal sub-line m1-2, so that the first data selection signal is input into the first signal sub-line m1-2 from two sides of the nth connector COFn through the second lead d2. In this way, the first signal sub-line m1-2 is connected to each of the connectors COF1 to COFn through leads led out from pins at two sides of each connector (pins outputting the first data selection signal), and receives the first data selection signal through the connectors COF1 to COFn. The two second signal sub-lines m2-1 and m2-2 have the same connection manner as the first signal sub-lines ml-1 and m1-2. The second signal sub-line m2-1 is connected to the connectors COF1 to COFn through third leads d3 led out from pins (pins outputting the second data selection signal) on both sides of each connector, and receives the second data selection signal through the connectors COF1 to COFn. The second signal sub-line m2-2 is connected to the connectors COF1 to COFn through fourth leads d4 led out from pins (pins outputting the second data selection signal) at both sides of each connector, and receives the second data selection signal through the connectors COF1 to COFn. It should be noted that each of the signal sub-lines is connected to different pins of each of the connectors COF1 to COFn. Since the data selection signals are input to the data selection signal lines (including the plurality of signal sub-lines) through the functional pins on both sides of the plurality of connectors COF1 to COFn, the display substrate may be considered as being divided into n regions; each region corresponds to one connector; the connector in the region adopt a double-sided driving mode, and the data selection signals are input to the data selectors connected to the data lines corresponding to the sub-pixels in the region by using the functional pins on both sides of the connector, so that the impedance on each data selection signal line (including the plurality of signal sub-lines) and the influence of the parasitic capacitance generated by each data line on each signal sub-line may be greatly reduced, and the charging difference of sub-pixels may be effectively reduced.

Figure 17:
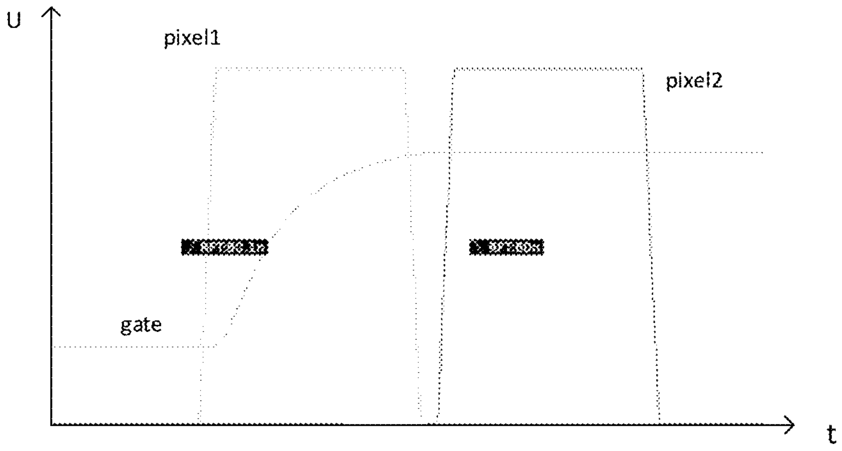
FIG. 17 is a waveform diagram showing a charging of two sub-pixels (pixel1 and pixel2) at a proximal end of the data selection signal line in the embodiment shown in FIG. 16.
Figure 18:
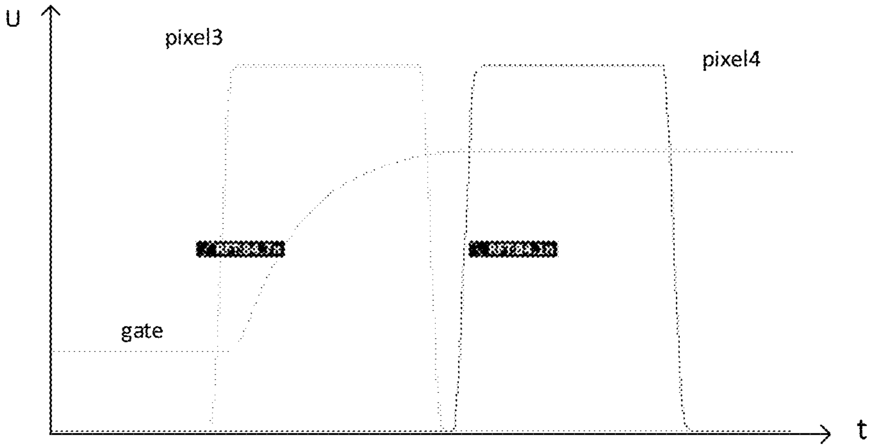
FIG. 18 is a waveform diagram showing a charging of two sub-pixels (pixel3 and pixel4) at a distal end of the data selection signal line in the embodiment shown in FIG. 16.

Referring to FIGS. 17 and 18, a simulation is performed by taking an example in which a line width of a signal sub-line of each data selection signal line is in a range of 60 μm to 130 μm, for example, 70 μm, 80 μm, 90 μm, 100 μm and 110 μm, which is not limited herein, and a certain width for the data selection signal line is selected to reduce the resistance of the data selection signal line, the pixels of the display substrate include 7680 columns×4320 rows, and include 23040 columns of sub-pixels based on the embodiment shown in FIG. 16, so as to obtain the waveform diagrams of a charging of the sub-pixels in FIGS. 17 and 18. At this time, the display substrate includes eight signal sub-lines in total, each of which loads (is connected to) 2880 data lines, and each signal line is connected to the connector through the functional pins on both sides of each connector. FIG. 17 is a waveform diagram showing a charging of two sub-pixels (pixel1 and pixel2) at a proximal end of each data selection signal line (first and second signal sub-lines). FIG. 18 is a waveform diagram showing a charging of two sub-pixels (pixel3 and pixel4) at a distal end of the data selection signal line (first and second signal sub-lines). Tr and Tf of sub-pixels (e.g., pixel1 and pixel2) corresponding to the proximal end of the data selection signal line each are about 80 ns; the charging rate of the sub-pixels is 96.2%; and Tr and Tf of sub-pixels (pixel3 and pixel4) corresponding to the distal end of the data selection signal line each are also about 80 ns; the charging rate of the sub-pixels also reaches 96.2%, so that the charging rate of the sub-pixels at the distal end is consistent with that of the sub-pixels at the proximal end, and the charging uniformity of the pixels is greatly improved. The proximal and distal ends are proximal ends k1, k2 and a distal end f1 in FIG. 2. Referring to FIG. 16, for the signal sub-lines connected to the same connector, a position close to the pin refers to as a proximal end and a position far away from the pin refers to as a distal end. The difference between the charging rate of the sub-pixel connected to the data line corresponding to the proximal end and the charging rate of the sub-pixel connected to the data line corresponding to the distal end is less than or equal to 10%. For example, the pins at both ends of each connector in FIG. 16 are connected to the same signal sub-line. At this time, the proximal end refers to parts of the signal sub-lines corresponding to the pins at both ends, while the distal end refers to a middle part between parts of the signal sub-lines corresponding to the pins at both ends. In this case, the rising edge time and the falling edge time of a charging waveform of the signal sub-line at the proximal end each are in a range of 50 nm to 120 ns, including the endpoint values 50 ns and 120 ns; the rising edge time and the falling edge time of the charging waveform of the signal sub-line at the distal end each are in a range of 50 ns to 120 ns, including the endpoint values 50 ns and 120 ns. Optionally, the rising edge time of the charging waveform of each of the signal sub-lines at the proximal end and the distal end may be 60 ns, 70 ns, 80 ns or 100 ns. Optionally, the falling edge time of the charging waveform of each of the signal sub-lines at the proximal end and the distal end may be can be 60 s, 70 ns, 80 ns or 100 ns. For the signal sub-lines connected to the same connector, a position close to the pin refers to as a proximal end, and a position away from the pin refers to as a distal end. The difference between the charging rate of the sub-pixel connected to the data line corresponding to the proximal end and the charging rate of the sub-pixel connected to the data line corresponding to the distal end is less than or equal to 10%, and the charging rate of the sub-pixel connected to the data line corresponding to the proximal end and the charging rate of the sub-pixel connected to the data line corresponding to the distal end is greater than or equal to 90%. It should be noted that, the charging rate in the current disclosure is for example as below: the whole display panel is illuminated with 255 grey-scale, the brightness of the display panel is S1; when an H1line picture is displayed by the display panel, the brightness of the display panel is S2, and the charging rate is 2s2/s1*100%, herein, the H1line picture refers to a picture with light and dark intervals in which one line is bright and its adjacent line is dark. For example, the odd lines display with 255 grey-scale, and the even lines display with 0 grey-scale.

It should be noted that there may be other connection manner between data selection signal lines and connectors, and the above is only an example of the embodiment of the present disclosure, and does not limit the embodiment of the present disclosure.

In a second aspect, an embodiment of the present disclosure further provides a display apparatus, which includes the above display substrate. It should be noted that the display apparatus provided in this embodiment may be: any product or component with a display function, such as a mobile phone, a tablet computer, a television, a display, a notebook computer, a digital photo frame, a navigator or the like. Other essential components of the display apparatus are understood by one of ordinary skill in the art, and are not described herein or should not be construed as limiting the present disclosure.

Further, the display apparatus may also include various types of display apparatus, such as a liquid crystal display apparatus, an organic light emitting diode (OLED) display apparatus, and a mini diode (Mini LED) display apparatus, which is not limited herein.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A display substrate, comprising:

a base substrate;

a plurality of sub-pixels arranged in an array and on the base substrate;

a plurality of data line groups on the base substrate; wherein each of the plurality of data line groups comprises a plurality of data lines, and each of the plurality of data lines is connected to one column of sub-pixels;

a plurality of data selectors on the base substrate and connected to the plurality of data line groups in a one-to-one correspondence; wherein data lines in a same data line group are connected to a same data selector; and a plurality of data selection signal lines, wherein different data selection signal lines output different data selection signals; and different data lines connected to a same data selector correspond to different data selection signal lines, respectively; and each of the data selection signal lines comprises a plurality of signal sub-lines;

wherein the display substrate further comprises a plurality of connectors, the plurality of connectors are arranged sequentially along a first direction; and each of the plurality of signal sub-lines extends along the first direction, and has two ends which are connected to two outermost connectors in the first direction of the plurality of connectors.

2. The display substrate of claim 1, wherein the plurality of signal sub-lines of a same data selection signal line transmit a same data selection signal.

3. The display substrate of claim 1, wherein each of the plurality of data line groups comprises a plurality of data lines, and in the plurality of data lines of a same data line group, any two adjacent data lines are spaced from each other by at least one of the plurality of data lines; or each of the plurality of data line groups comprises adjacent ones of the plurality of data lines.

4. The display substrate of claim 3, wherein each of the plurality of data line groups comprises two data lines which are spaced from each other by another data line of the plurality of data lines, or each of the plurality of data line groups comprises two adjacent data lines.

5. The display substrate of claim 3, wherein a first sub-pixel, a second sub-pixel and a third sub-pixel arranged in sequence along a first direction form one pixel unit;

pixel units in a same column are connected to a same data line group; each data line group comprises three adjacent data lines connected to one column of first sub-pixels, one column of second sub-pixels and one column of third sub-pixels, respectively;

the display substrate comprises a first data selection signal line, a second data selection signal line and a third data selection signal line;

the first data selection signal line comprises two first signal sub-lines sequentially corresponding to data lines, which are connected to the first sub-pixels, in data line groups connected to the plurality of data selectors;

the second data selection signal line comprises two second signal sub-lines sequentially corresponding to data lines, which are connected to the second sub-pixels, in data line groups connected to the plurality of data selectors; and the third data selection signal line comprises two third signal sub-lines sequentially corresponding to data lines, which are connected to the third sub-pixels, in data line groups connected to the plurality of data selectors.

6. The display substrate of claim 1, wherein the display substrate comprises a first data selection signal line and a second data selection signal line;

the first data selection signal line comprises four first signal sub-lines sequentially corresponding to data lines, which are connected to odd columns of sub-pixels, in the plurality of data line groups connected to the plurality of data selectors; and the second data selection signal line comprises four second signal sub-lines sequentially corresponding to data lines, which are connected to even columns of sub-pixels, in the plurality of data line groups connected to the plurality of data selectors.

7. The display substrate of claim 1, wherein each of the plurality of data selectors comprises a plurality of transistors;

the number of the transistors in each of the plurality of data selectors is the same as the number of the data lines in each of the plurality of data line groups; and in each of the plurality of data selectors, control electrodes of the transistors are connected to the corresponding data selection signal lines, respectively; first electrodes of the transistors are connected to different data lines, respectively, and second electrodes of the transistors are connected together to receive data voltages.

8. The display substrate of claim 7, wherein each of the plurality of data selectors comprises a first transistor and a second transistor;

a first electrode of the first transistor in the data selector is connected to a corresponding data line, and a first electrode of the second transistor in the data selector is connected to a corresponding data line;

the display substrate comprises a first data selection signal line and a second data selection signal line, the first data selection signal line is connected to control electrodes of the first transistors in the plurality of data selectors;

the second data selection signal line is connected to control electrodes of the second transistors in the plurality of data selectors; and the second electrodes of the first transistor and the second transistor in each of the plurality of data selectors are connected together.

9. The display substrate of claim 1, wherein the display substrate comprises a first data selection signal line and a second data selection signal line;

the first data selection signal line comprises two first signal sub-lines sequentially corresponding to data lines, which are connected to odd columns of sub-pixels, in the plurality of data line groups connected to the plurality of data selectors; and the second data selection signal line comprises two second signal sub-lines sequentially corresponding to data lines, which are connected to even columns of sub-pixels, in the plurality of data line groups connected to the plurality of data selectors.

10. A display apparatus, comprising the display substrate of claim 1, wherein the display substrate comprises a first side and a second side opposite to each other, a third side and a fourth side opposite to each other;

the display apparatus further comprises a timing controller arranged on a side of the plurality of sub-pixels close to the first side; and the plurality of data selectors are between the timing controller and the plurality of sub-pixels.

11. The display apparatus of claim 10, wherein the plurality of connectors are on the base substrate and between the timing controller and the plurality of data selectors, wherein the plurality of connectors are arranged along an extending direction of the first side, and the plurality of connectors are connected to the timing controller;

each of the plurality of signal sub-lines extends along the extending direction of the first side, and a connector closest to the third side and a connector closest to the fourth side in the plurality of connectors are connected to two ends of each of the plurality of signal sub-lines, respectively.

12. The display apparatus of claim 10, wherein each of the plurality of connectors is a chip on flex.

13. The display apparatus of claim 10, further comprising a source driver which comprises a plurality of data voltage output channels, wherein each of the plurality of data selectors is connected to one of the plurality of data voltage output channels.

14. A display substrate, comprising:

a base substrate;

a plurality of sub-pixels arranged in an array and on the base substrate;

a plurality of data line groups on the base substrate; wherein each of the plurality of data line groups comprises a plurality of data lines, and each of the plurality of data lines is connected to one column of sub-pixels;

a plurality of data selectors on the base substrate and connected to the plurality of data line groups in a one-to-one correspondence; wherein data lines in a same data line group are connected to a same data selector; and a plurality of data selection signal lines, wherein different data selection signal lines output different data selection signals; and different data lines connected to a same data selector correspond to different data selection signal lines, respectively; and each of the data selection signal lines comprises a plurality of signal sub-lines, the display substrate further comprises a plurality of connectors, wherein the plurality of connectors are arranged sequentially along a first direction; and each of the plurality of signal sub-lines extends along the first direction, and is connected to each of the plurality of connector through pins on two opposite sides of the connector in the first direction.

15. The display substrate of claim 14, wherein for the signal sub-lines connected to a same connector, a position close to the pin refers to as a proximal end, and a position away from the pin refers to as a distal end, and a difference between a charging rate of a sub-pixel connected to a data line corresponding to the proximal end and a charging rate of a sub-pixel connected to a data line corresponding to the distal end is less than or equal to 15%.

16. The display substrate of claim 15, wherein the charging rate of the sub-pixel connected to the data line corresponding to the proximal end and the charging rate of the sub-pixel connected to the data line corresponding to the distal end is greater than or equal to 90%.

17. The display substrate of claim 15, wherein a rising edge time and a falling edge time of a charging waveform of the signal sub-line at the proximal end each are in a range of 50 nm to 120 ns; and a rising edge time and a falling edge time of a charging waveform of the signal sub-line at the distal end each are in a range of 50 ns to 120 ns.

18. A display substrate, comprising:

a base substrate;

a plurality of sub-pixels arranged in an array and on the base substrate;

a plurality of data line groups on the base substrate; wherein each of the plurality of data line groups comprises a plurality of data lines, and each of the plurality of data lines is connected to one column of sub-pixels;

a plurality of data selectors on the base substrate and connected to the plurality of data line groups in a one-to-one correspondence; wherein data lines in a same data line group are connected to a same data selector; and a plurality of data selection signal lines, wherein different data selection signal lines output different data selection signals; and different data lines connected to a same data selector correspond to different data selection signal lines, respectively; and each of the data selection signal lines comprises a plurality of signal sub-lines, wherein a width of each of the plurality of signal sub-lines is in a range of 60 μm to 130 μm.

19. A display apparatus, comprising the display substrate of claim 14, wherein the display substrate comprises a first side and a second side opposite to each other, a third side and a fourth side opposite to each other;

the display apparatus further comprises a timing controller arranged on a side of the plurality of sub-pixels close to the first side; and the plurality of data selectors are between the timing controller and the plurality of sub-pixels, wherein the plurality of connectors are on the base substrate and between the timing controller and the plurality of data selectors, wherein the plurality of connectors are arranged along an extending direction of the first side, and the plurality of connectors are connected to the timing controller;

each of the plurality of signal sub-lines extends along the extending direction of the first side, and each of the plurality of signal sub-lines is connected to each of the plurality of connector through pins of the connector close to the third side and the fourth side.

* * * * *